(12) United States Patent
Mikami et al.

(10) Patent No.: US 6,741,806 B2
(45) Date of Patent: May 25, 2004

(54) LENS-FITTED PHOTO FILM UNIT AND METHOD FOR MANUFACTURING LENS-FITTED PHOTO FILM UNIT

(75) Inventors: Yuji Mikami, Minami-Ashigara (JP); Kazuo Kamata, Minami-Ashigara (JP); Takeshi Masuda, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/441,112

(22) Filed: May 20, 2003

(65) Prior Publication Data

US 2003/0219246 A1 Nov. 27, 2003

(30) Foreign Application Priority Data

| | | |
|---|---|---|
| May 24, 2002 | (JP) | 2002-151329 |
| Aug. 2, 2002 | (JP) | 2002-226510 |
| Aug. 22, 2002 | (JP) | 2002-241480 |

(51) Int. Cl.[7] ............................................... G03B 17/02
(52) U.S. Cl. ............................. 396/6; 396/179; 396/195
(58) Field of Search ............................... 396/6, 179, 195

(56) References Cited

U.S. PATENT DOCUMENTS 6,393,214 B1 * 5/2002 Takaba et al. ................. 396/6

FOREIGN PATENT DOCUMENTS

JP    11-326987    * 11/1999

* cited by examiner

*Primary Examiner*—David M. Gray
(74) *Attorney, Agent, or Firm*—Young & Thompson

(57) ABSTRACT

A stop lever is rotatable on a light shielding tunnel with an exposure aperture. When the stop lever is at a fast shutter speed position, a support pad is located below a lower metal plate of a synchronization switch of a flash circuit. The support pad holds the lower metal plate to limit rotation of a shutter blade, so that photography is carried out at a fast shutter speed. The synchronization switch is turned on after the exposure aperture is fully open. When the stop lever is at a slow shutter speed position, a support pad is away from the lower metal plate to obtain a slow shutter speed. It is possible to obtain a fast shutter speed by providing a light shielding tunnel with a fixed stopper to limit rotation of the shutter speed, and a slow shutter speed by providing a light shielding tunnel without a stopper.

20 Claims, 18 Drawing Sheets

LENS-FITTED PHOTO FILM UNIT AND METHOD FOR MANUFACTURING LENS-FITTED PHOTO FILM UNIT

BACKGROUND OF THE INVENTION

1. Field of the Invention

The present invention relates to a lens-fitted photo film unit to make exposure through an exposure aperture. More particularly, the present invention relates to a lens-fitted photo film unit to ensure flash light emission at the time when the exposure aperture is fully open.

2. Description Related to the Prior Art

A lens-fitted photo film unit has a simple photography mechanism, such as a struck-type shutter mechanism that has a shutter blade to open and close an exposure aperture. Since a photo filmstrip is preloaded in the lens-fitted photo film unit in manufacture, a user can enjoy photography right after the purchase of the lens-fitted photo film unit.

Some lens-fitted photo film units have flash devices to emit flash light to increase exposure amount in indoor or night photography. The flash device has a flash circuit that includes a main capacitor, a flash discharge tube and a synchronization switch. The synchronization switch has a pair of metal plates. In photography, the shutter blade is rotated to press one metal plate onto the other metal plate so that the synchronization switch is turned on. When the main capacitor is charged at that time, the synchronization switch outputs a trigger signal to discharge the electrons in the main capacitor to the flash discharge tube, so that flash light is emitted to increase exposure amount of a main subject.

With the flash device of the lens-fitted photo film unit, however, it is difficult to apply enough amount of flash light to a background behind the main subject. When indoor or night photography is carried out with flash device, the background on the exposed image is much darker than the main subject.

In order to deal with this problem, Japanese laid-open patent (JP-A) 11-326987 discloses a lens-fitted photo film unit that enables multiple shutter speeds by moving a stopper to limit the rotation of the shutter blade. Exposure amount of the background is increased in indoor or night photography by making the shutter speed slower.

In order to prevent failure exposure due to camera-shake, it is desirable to shorten the exposure time by making the shutter speed faster. Thus, various improvements, such as a photo filmstrip with higher sensitivity and a brighter taking lens, are applied to the lens-fitted photo film unit. It is necessary to start flash light emission at the time when the exposure aperture is fully open. Shorter exposure time makes it difficult to start flash light emission at the appropriate timing during exposure.

Moreover, the metal plates of the synchronization switch are bent upon being pressed by the shutter blade. If bending characteristics of the metal plates is changed, or if the metal plates are deformed after plural photography, time lag between flash light emission and exposure is happened. Such time lag causes under exposure.

It is also possible to control the shutter speed by providing kinds of lens-fitted photo film units with different shutter speeds. These lens-fitted photo film units have stoppers to limit the rotation of the shutter blade. The stoppers are fixed at different positions. Such lens-fitted photo film units do not include a mechanism to move the stopper, so it is possible to reduce the manufacture cost of the lens-fitted photo film unit.

Although these lens-fitted photo film units have different mechanical parts, it is preferable to use common parts as many as possible in order to increase the productivity and reduce the manufacture cost.

SUMMARY OF THE INVENTION

An object of the present invention is to provide a lens-fitted photo film unit that ensures flash light emission at an appropriate timing in photography at a fast shutter speed.

Another object of the present invention is to increase the productivity of the lens-fitted photo film units with different shutter speeds.

To achieve the above objects, the lens-fitted photo film unit has a stopper to limit the movement of a shutter lever, and the stopper is provided at a position in contact to or near one of two contact plates of a synchronization switch of a flash device. When a shutter blade presses the first contact plate onto the second contact plate at a position to open the exposure aperture, the stopper holds the shutter blade, the first and second contact plates to limit the movement of said shutter blade.

The lens-fitted photo film unit is manufactured by attaching the stopper at a position in contact to or near the second contact plate. A lens-fitted photo film unit without the stopper has a slower shutter speed, compared to the one with the stopper, because the rotation of the shutter blade is not limited. It is possible to provide plural lens-fitted photo film unit with different shutter speeds by attaching or removing the stopper.

In the preferred embodiment, the stopper is attached to a lens cover in the rotatable manner, and is movable between a fast shutter speed position in contact to or near the second contact plate and a slow shutter speed position away from the second contact plate. At the fast shutter speed position, the stop lever holds the shutter blade, the first and second contact plates to limit the rotation of the shutter blade at the open position.

One end portion of the stop lever at the fast shutter speed position is moved to the free end side of the second contact plate. The end portion of the stop lever prevents the second contact plate from being deformed when the first contact plate presses the second contact plate in exposure.

The lens-fitted photo film unit may have an operation member, a movable aperture plate and changeover means to move the stop lever according to the operation of the operation member. The operation member is preferably movable between a first position to turn off the flash device, a second position to turn on the flash device and holds the stop lever at the fast shutter speed position, and a third position to turn on the flash device and holds the stop lever at the slow shutter speed position. The changeover means preferably set a small aperture state when the stop lever is at the fast shutter speed position, and preferably set a large aperture state when the stop lever is at the slow shutter speed position.

According to the present invention, the stopper or the stop lever supports one of the contact plates of the synchronization switch of the flash device, so it is possible to ensure flash light emission at an appropriate timing even though the shutter speed becomes faster. Moreover, it is possible to increase productivity of the lens-fitted photo film units with different shutter speeds by using common mechanical and electrical components other than the stopper or the stop lever.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
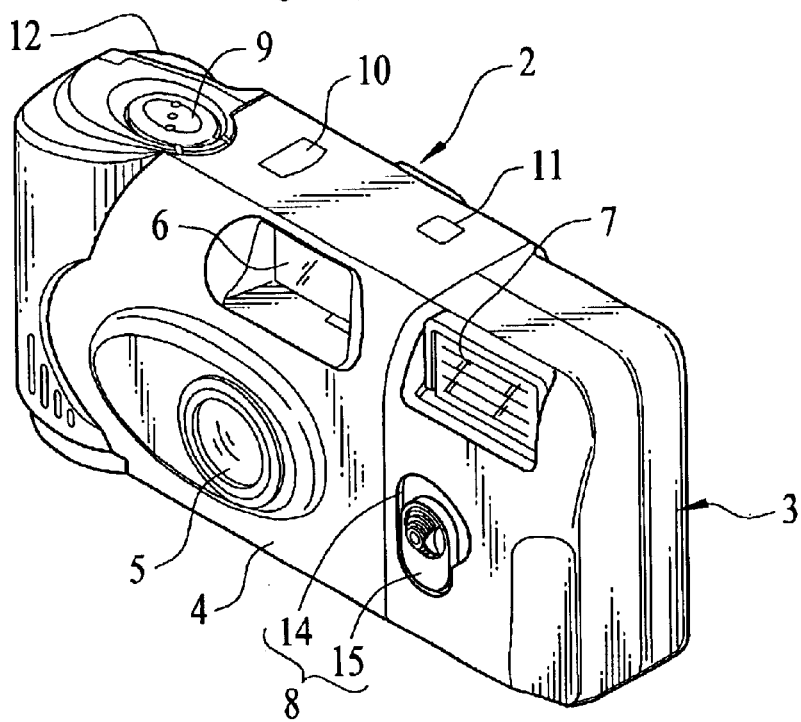
FIGS. 1, 2 and 3 are perspective views of a lens-fitted photo film unit in a daylight photography mode, in a daylight synchronized flash photography mode and in a night photography mode, respectively.

In FIG. 1, a lens-fitted photo film unit 2 has a unit body 3 that contains photography mechanisms and a photo filmstrip. A label 4 is glued to the unit body 3 so as to wrap a portion of the unit body 3.

A taking lens 5, a viewfinder 6, a flash emitter 7 and a photography mode selector 8 are provided in a front side of the unit body 3. A shutter button 9, a frame counter window 10 and a flash charge indication window 11 are provided in a top side of the unit body 3. A winding dial 12 is provided in a rear side of the unit body 3. Some components, such as the taking lens 5, the viewfinder 6, are exposed through openings formed in the label 4.

Figure 2:
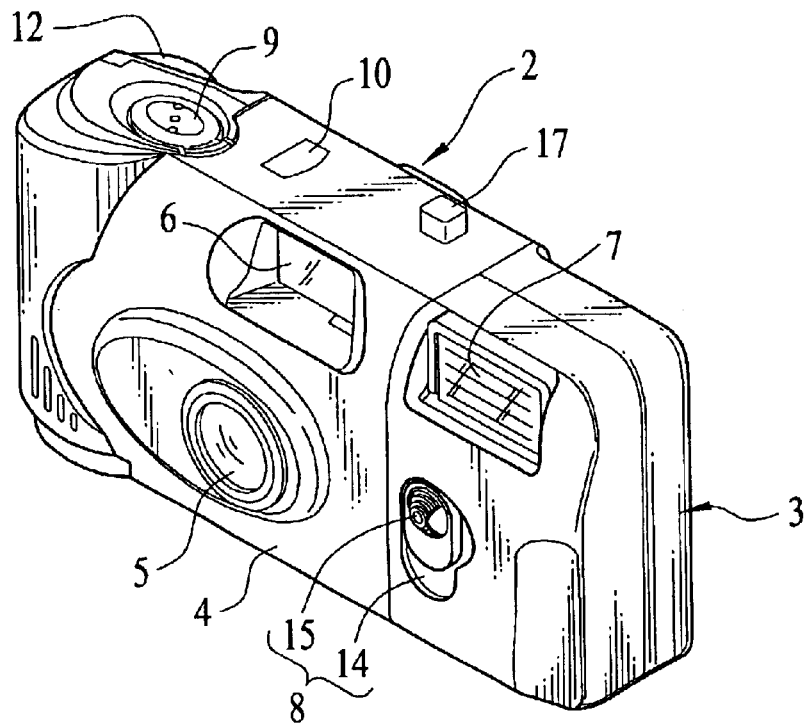
Figure 3:
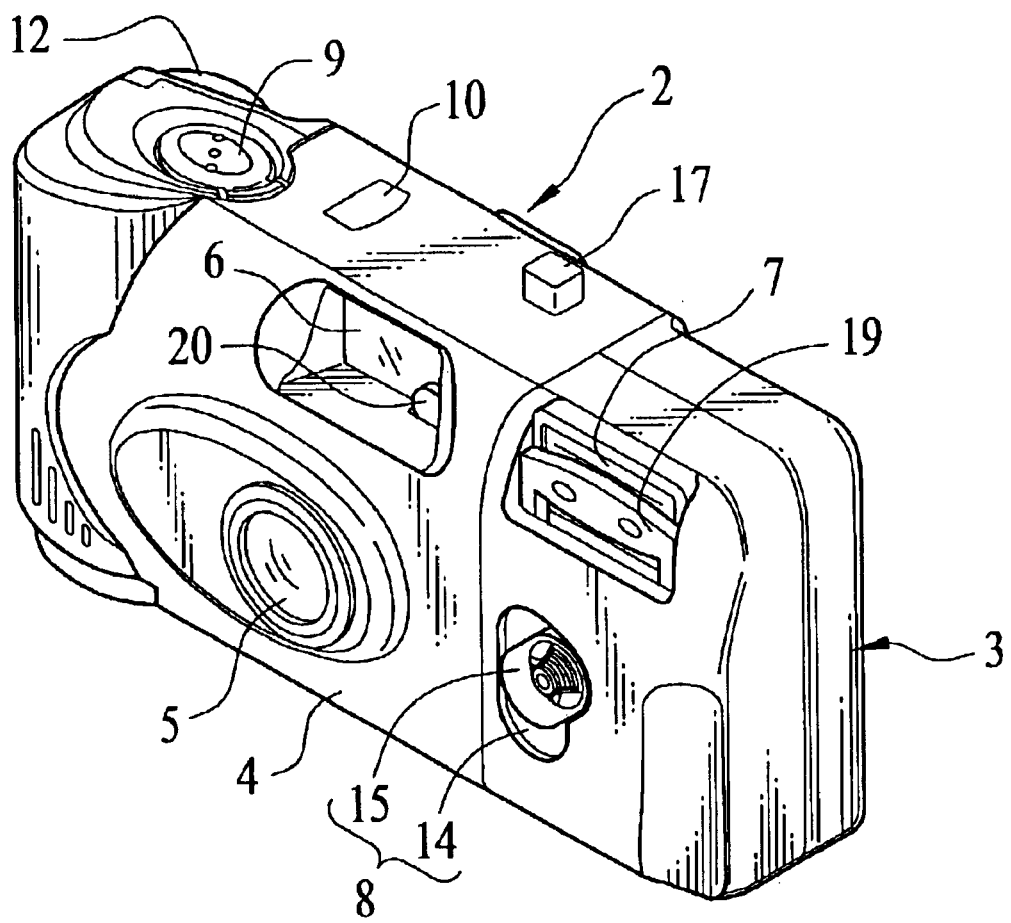

The photography mode selector 8 comprises an oval-shaped operation member 15 that is movable inside a slide opening 14 formed in the front surface of the unit body 3. The operation member 15 is located at a first position in FIG. 1. The operation member 15 is moved upward from the first position to a second position shown in FIG. 2, and is rotated clockwise from the second position to a third position shown in FIG. 3.

When the operation member 15 is at the first position, lens-fitted photo film unit 2 is in a daylight photography mode without flashlight. When the operation member 15 is at the second position, lens-fitted photo film unit 2 is in a daylight synchronized flash photography mode with flash light. In both photography modes, photography is carried out through a small aperture and at fast shutter speed. A flash charge indicator 17 is protruded upward through the flash charge indication window 11 in the daylight synchronized flash photography mode. In flash photography, the flash charge indicator 17 guides indication light towards outside of the unit body 3, so as to inform a user that the main capacitor 34 (FIG. 4) is fully charged.

When the operation member 15 is at the third position, lens-fitted photo film unit 2 is in a night photography mode in which flash photography is carried out through a large aperture and at slow shutter speed. In the night mode (see FIG. 3), a light amount reduction plate 19 is moved upward to a position in front of the flash emitter 7 to decrease the amount of flash light. Moreover, a circular indication plate 20 is appeared in front of the viewfinder 6 so as to inform a user of the night photography mode.

Figure 4:
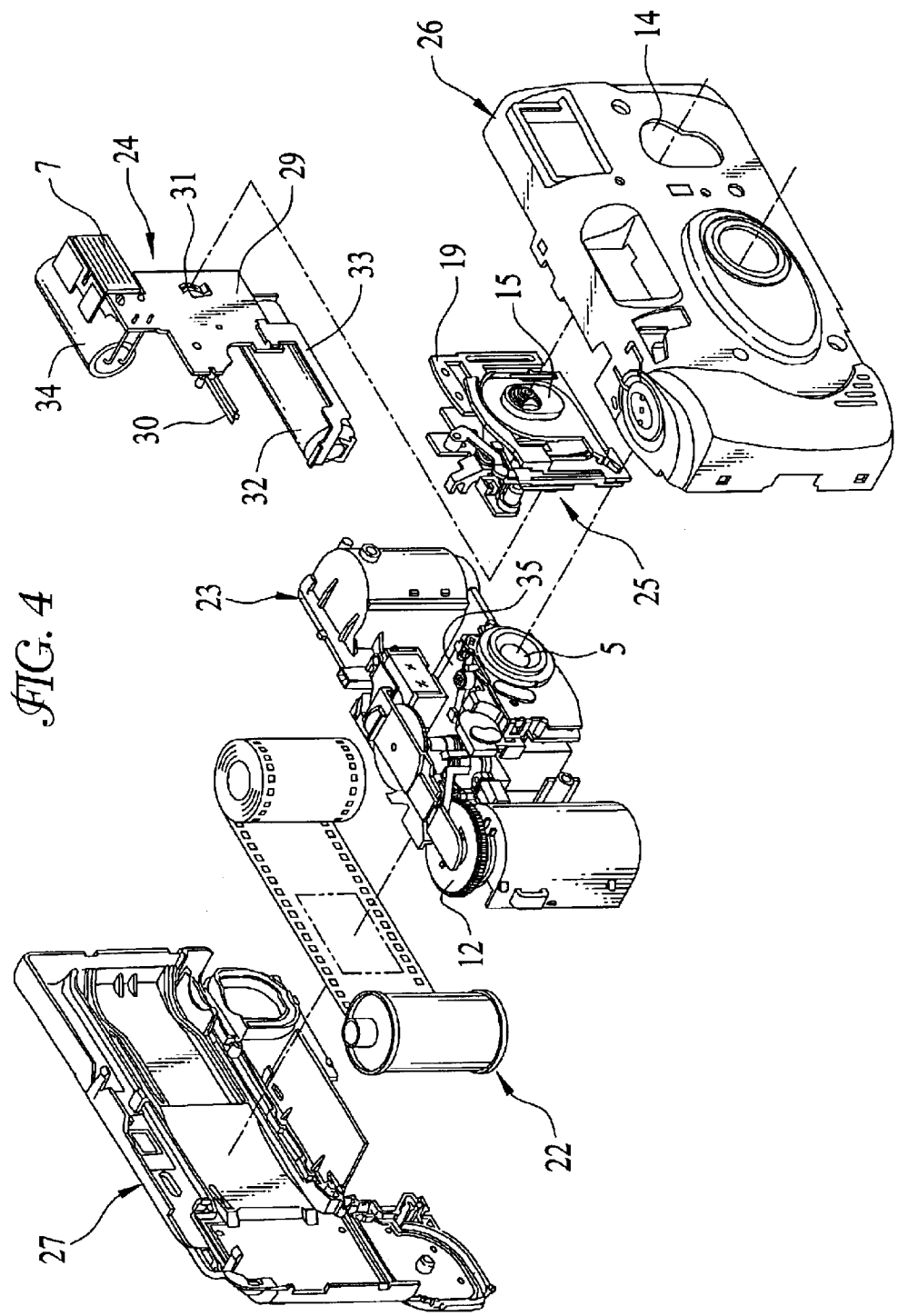
FIG. 4 is an exploded perspective view of the lens-fitted photo film unit.

In FIG. 4, the unit body 3 has a main body 23, a flash device 24, a photography mode changeover mechanism 25, a front cover 26 and a rear cover 27. An ISO-135 type cartridge 22 is loaded in the main body 23. It is also possible to use a photo film of other film format, such as IX-240 type. The front and rear covers 26, 27 cover the main body 23 in light-tight manner.

The flash device 24, attached to the front side of the main body 23, has a print circuit board 29 and the flash emitter 7. The flash emitter 7 contains a flash discharge tube, a reflector and a diffuser. Electrical circuit elements, such as a synchronization switch 30, a flash charge switch 31, a battery holder 33 and a main capacitor 34, are fixed to the print circuit board 29 to form a flash circuit. The synchronization switch 30 is turned on to emit flash light upon shutter release operation. A battery 32 is held in the battery holder 33. When the flash charge switch 31 is turned on, the flash circuit is operated to charge the main capacitor 34.

Figure 5:
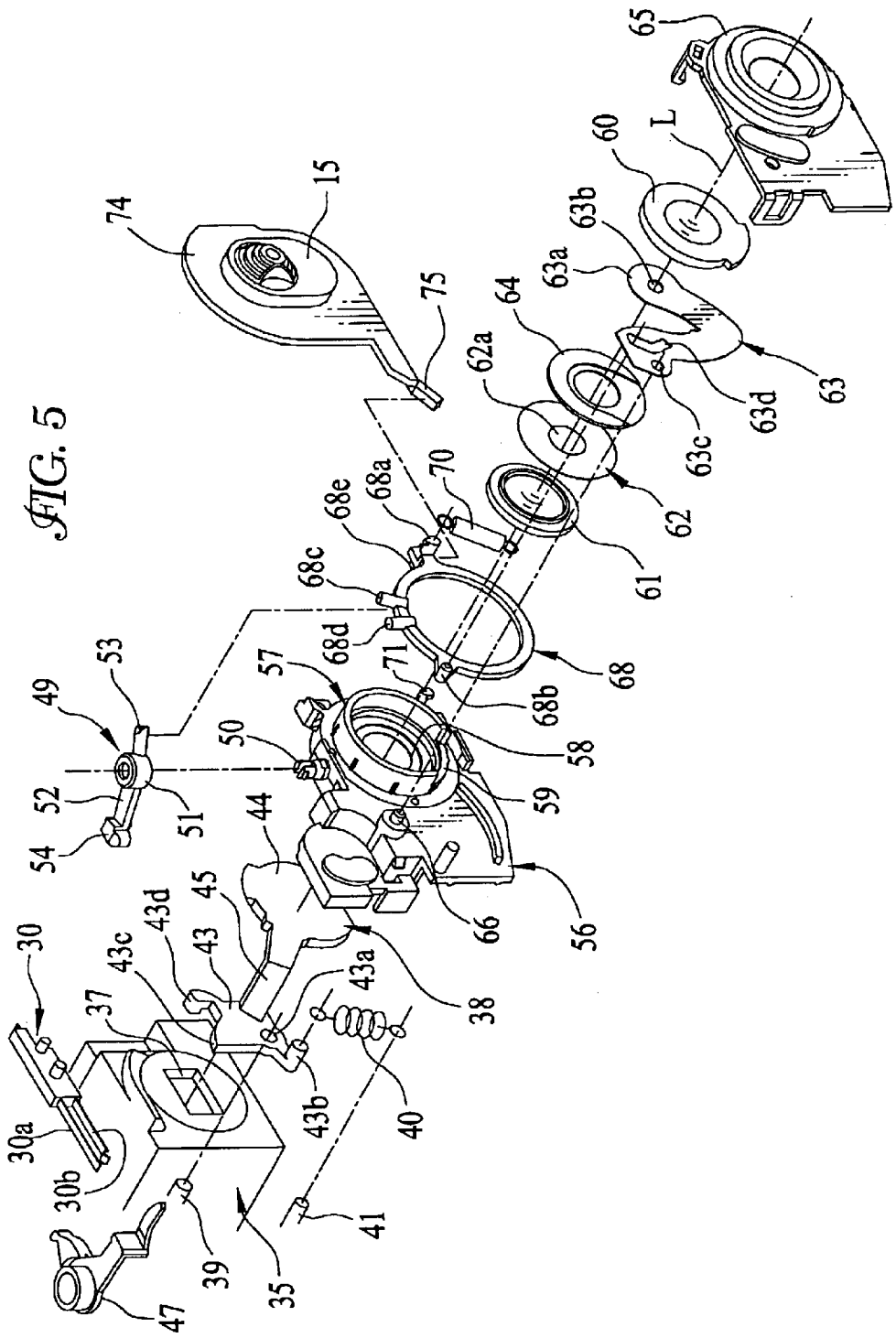
FIG. 5 is an exploded perspective view of a shutter device and an exposure device.

A light shielding tunnel 35 is disposed in the middle of the front side of the main body 23. A shutter charge mechanism, a shutter release mechanism, a film winding mechanism, a film counter, an exposure mechanism and a taking lens system are assembled on the main body 23 around the light shielding tunnel 35. The shutter release mechanism, the exposure mechanism and the taking lens system are depicted in FIG. 5. A rectangular-shaped exposure aperture 37 is formed in the front side of the light shielding tunnel 35.

A shutter blade 38 is rotatable around a pin 39 that is provided on the main body 23. The shutter blade 38 has a base portion 43, a blade portion 34 and a connection portion 45. The pin 39 is inserted in an opening 43a formed in the base portion 43 to hold the shutter blade 38. One end of a coil spring 40 is hooked on a pin 41 formed in the main body 23. The other end of the coil spring 41 is hooked on a pin 43b of the shutter blade 38. The coil spring 40 biases the shutter blade 38 counterclockwise so that the shutter blade 38 is held at a close position in which the blade portion 44 covers the exposure aperture 37.

The shutter release mechanism has a shutter drive lever 47 that is rotatably supported on the base body 23. The shutter charge mechanism rotates the shutter drive lever 47 clockwise to a charge position from a release position. When the shutter button 9 is pressed down, the shutter release mechanism is actuated to rotate the shutter drive lever 47 counterclockwise from the charge position to the release position. In the rotation, the shutter drive lever 47 strikes a struck portion 43c of the shutter blade 38. Then, the shutter blade 38 rotates against the bias of the coil spring 40 toward an end portion (see FIG. 9) where the shutter blade 38 contacts the stopper pin 56a provided on a lens holder 56. When the shutter blade 38 is at a full-open position (see FIG. 8), the exposure aperture 37 is completely open. After the shutter blade 38 reaches the end position, the shutter blade 38 is rotated toward the close position by the bias of the coil spring 40.

When the shutter blade 38 rotates toward the end position, a synchronization projection 43d presses an upper metal plate (first contact) 30a toward a lower metal plate (second contact) 30b. When both metal plates 30a, 30b are contacted with each other, the synchronization switch 30 is turned on to output a trigger signal for flash light emission.

The lens holder 56 is attached to the main body 23 so as to cover the shutter blade 38. The lens holder 56 has a pin 50 to hold a boss 51 of a stop lever 49 in rotatable manner. The stop lever 49 has the boss 51, a pair of arms 52, 53 and a support pad 54. The support pad 54 is formed on an end portion of the arm 52.

Figure 6:
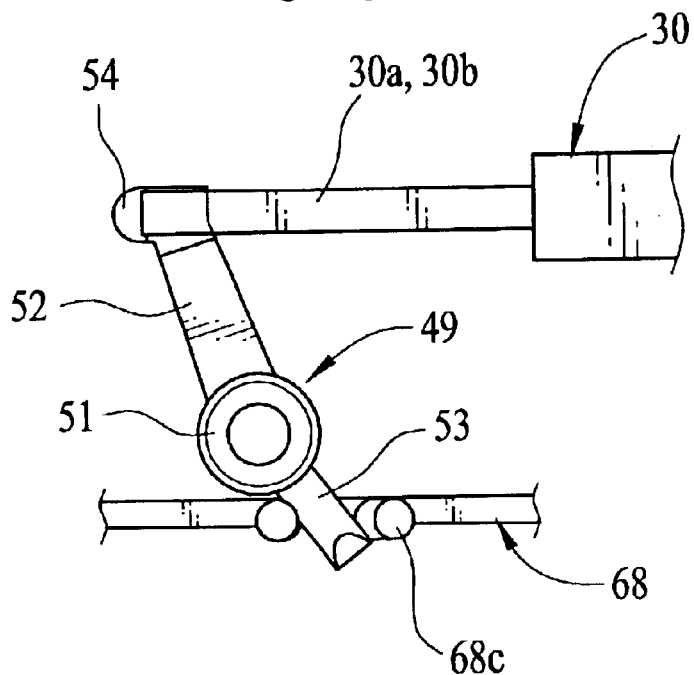
FIG. 6 is a top plan view of a stop lever at a fast shutter speed position.
Figure 7:
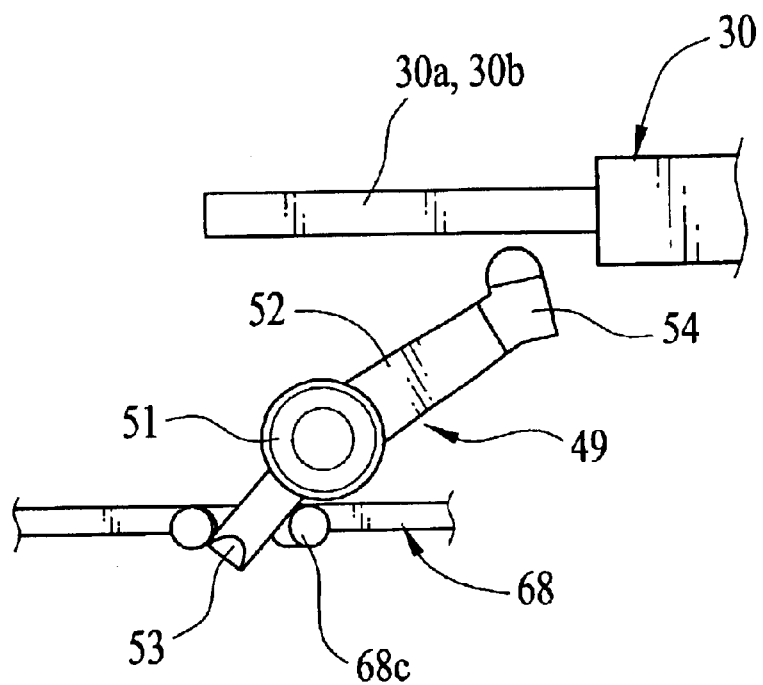
FIG. 7 is a top plan view of the stop lever at a slow shutter speed position.

The stop lever 49 is rotatable between a fast shutter speed position and a slow shutter speed position. At the fast shutter speed position, the support pad 54 of the stop lever 49 is in contact with the bottom side of the free end of the lower metal plate 30b, as shown in FIG. 6. At the slow shutter speed position, the support pad 54 is away from the free end of the lower metal plate 30b, as shown in FIG. 7.

In order to ensure the contact of the support pad 54 with the lower metal plate 30b, it is preferable to incline the free end of the lower metal plate 30b slightly downward toward the support pad 54. When the stop lever 49 is moved to the fast shutter speed position, the support pad 54 is inserted underneath the lower metal plate 30b and presses the lower metal plate 30b upward. It is also preferable to form an inclined surface in the bottom of the pin 50, such that the support pad 54 is moved vertically to contact the lower bottom plate 30b as the stop lever 49 moves toward the fast shutter speed position.

Figure 8:
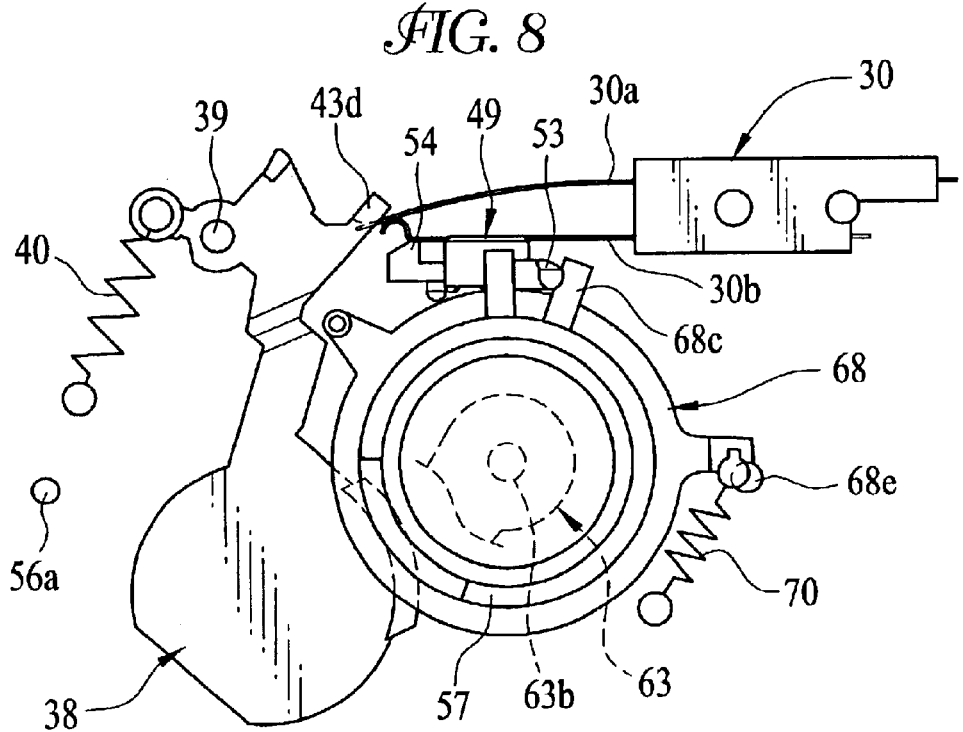
FIGS. 8 and 9 are front plan views of the shutter device wherein the stop lever is at a fast shutter speed position and a slow shutter speed position, respectively.

When the stop lever 49 is at the fast shutter speed position, the synchronization projection 43d of the shutter blade 38 presses the upper metal plate 30a to turn on the synchronization switch 30, as shown in FIG. 8. Then, flash light is emitted through the flash light emitter 7 if the flash circuit is activated. Since the support pad 54 prevents the lower metal plate 30b from being bent downward, the rotation of the shutter blade 38 is limited at the full-open position shown in FIG. 8. Then, the coil spring 40 rotates the shutter blade counterclockwise to the close position. Thus, it is possible to carry out photography at a fast shutter speed, 1/120 sec for instance.

Moreover, the metal plates 30a, 30b are put between the synchronization projection 43d and the support pad 54 when the stop lever 49 is at the fast shutter speed position. Thus, it is possible to ensure flash light emission at an appropriate timing when the exposure aperture 37 is fully open.

Figure 9:
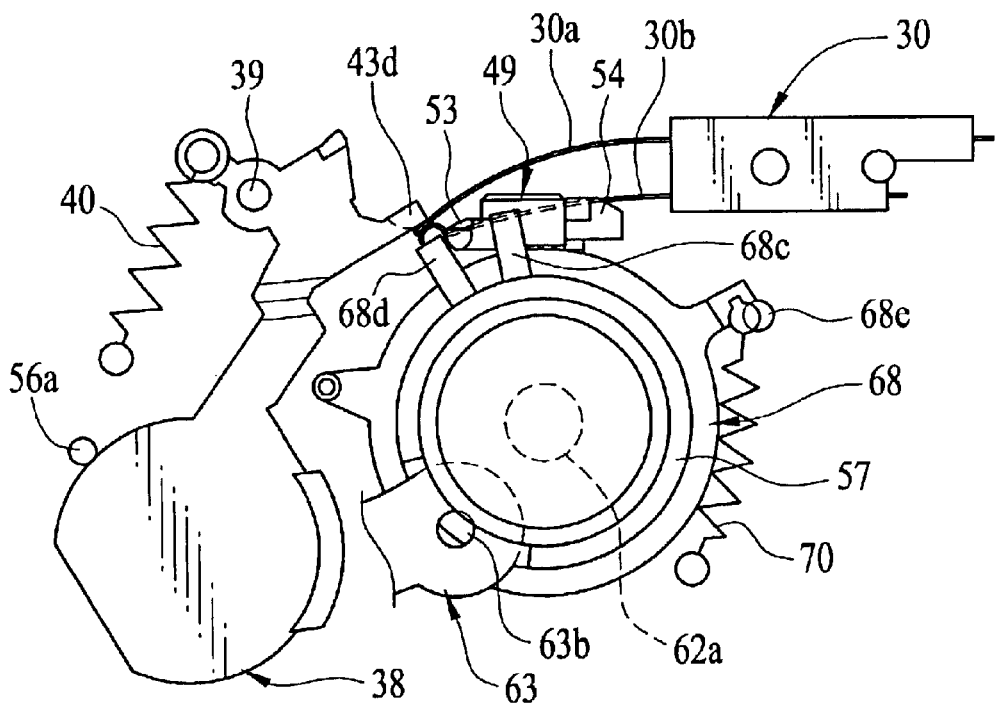

On the other hand, the support pad 54 does not support the lower metal plate 30b when the strip lever 49 is at the slow shutter speed position, as shown in FIG. 9. In photography, the shutter blade 38 bends the metal plates 30a, 30b and reaches to the end position. Since the rotation of the shutter blade 38 becomes larger, photography at a slow shutter speed, 1/45 sec for instance, is realized.

In FIG. 5, a lens barrel 57 is provided on the front surface of the lens holder 56. Subject light through an opening 58 formed in the center of the lens barrel 57. A cutout 59 is formed in the lateral side of the lens barrel 57. The lens barrel 57 contains a first lens element 60 and a second lens element 61 that consist of the taking lens 5. An aperture plate 62, a spacer 64 and a aperture changeover plate 63 are arranged between the first and second lens elements 60, 61 in this order listed. The aperture plate 62 has a circular shape with a large aperture 62a in the center. A lens cover 65 is attached to the front side of the lens holder 56 so as to fix the taking lens 5, the aperture plate 62 and the spacer 64 inside the lens barrel 57.

The aperture changeover plate 63 is a roughly L-shaped thin plate. One end of the aperture changeover plate 63 is an aperture portion 63a that has a size enough to cover the large aperture 62a. A small aperture 63b, formed in the aperture portion 63a, is smaller than the large aperture 62a. A pin 66 on the front side of the lens holder 56 inserts an opening 63c that is formed in the other end portion of the aperture changeover plate 63, so that the aperture changeover plate 63 is rotatably attached to the lens holder 56. A v-shaped long opening 63d is formed in the aperture changeover plate 63 near the support opening 63c.

The aperture changeover plate 63 is rotatable between a small aperture position and a large aperture position. The small aperture 63b is located on the photographic optical axis L at the small aperture position. At the large aperture position, the aperture portion 63a goes out of the lens barrel 57 through the cutout 59 to expose the large aperture 62a. A hollow area is formed in the front side of the spacer 64 to enable rotation of the aperture portion 63a.

A changeover ring 68 is rotatable around the lens barrel 57, and held between projections on the lens barrel 57 and the lens cover 65. The changeover ring 68 is biased clockwise by an extension spring 70. One end of the extension spring 70 is hooked on a hook pin 68a formed in the changeover ring 68, and the other end thereof is hooked on a pin 71 formed on the lower front side of the lens holder 56. An engagement pin 68b, a pair of arm hold pin 68c, 68d, and a linkage pin 68e are integrated with the changeover ring 68. The engagement pin 68b is inserted in the long opening 63d of the aperture changeover plate 63 so as to connect the changeover ring 68 with the aperture changeover plate 63. The arm 53 of the stop lever 49 is held between the pair of the arm hold pins 68c. The hook pin 68a and the engagement pin 68b protrude forward, while the linkage pin 68d protrudes rearward.

A substantially oval-shaped changeover plate 74 is integrated with the operation member 15. The changeover plate 74 has a linkage projection 75 that presses the linkage pin 68d upward when the operation member 15 is rotated to the third position from the second position. Then, the changeover ring 68 is rotated counterclockwise against the bias of the extension spring 70.

Figure 10:
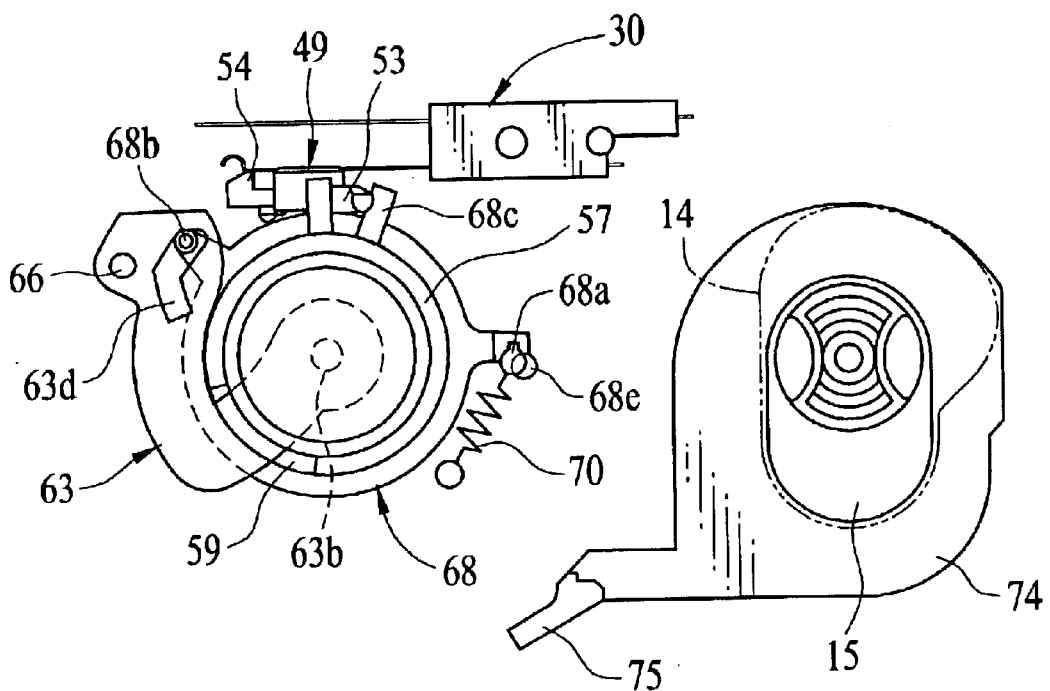
FIGS. 10, 11 and 12 are front plan views of the exposure device in a daylight photography mode, in a daylight synchronized flash photography mode and in a night photography mode, respectively.
Figure 11:
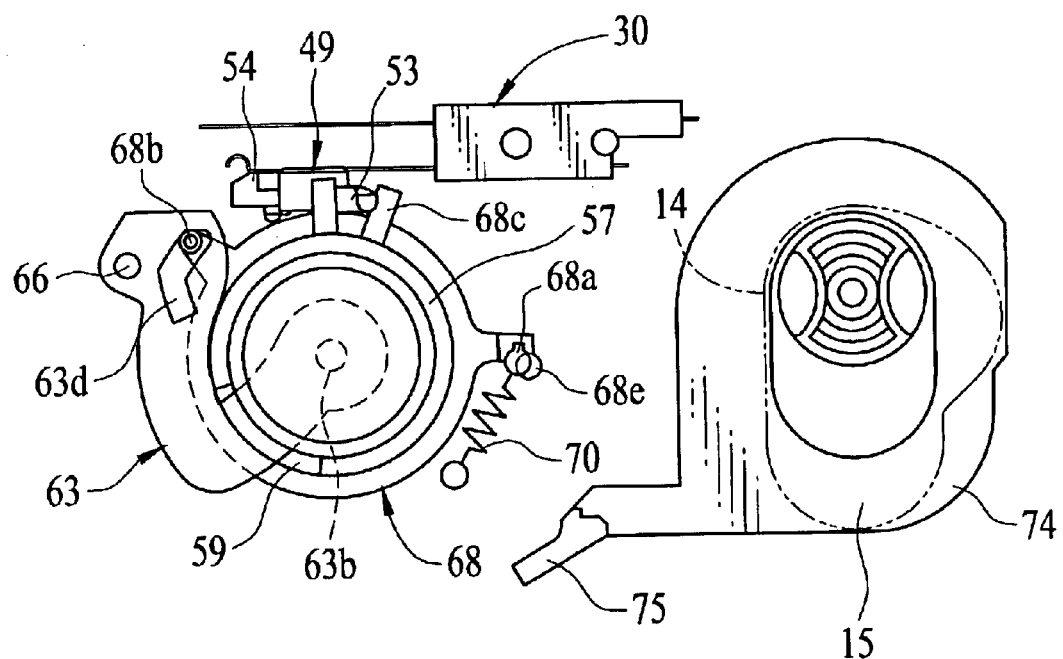

As shown in FIGS. 10 and 11, the linkage projection 75 is away from the linkage pin 68d of the changeover ring 68 when the operation member is at the first and second positions. Due to the engagement of the engagement pin 68b with the aperture changeover plate 63, the changeover ring 68 rotates the aperture changeover plate 63 so that the small aperture 63a is inserted in the photographic optical axis L. Since the spacer 64 limits the rotation of the aperture changeover plate 63, the changeover ring 68 is held at an initial position shown in FIG. 10. The arm hold pins 68c hold the stop lever 49 at the fast shutter speed position.

Figure 12:
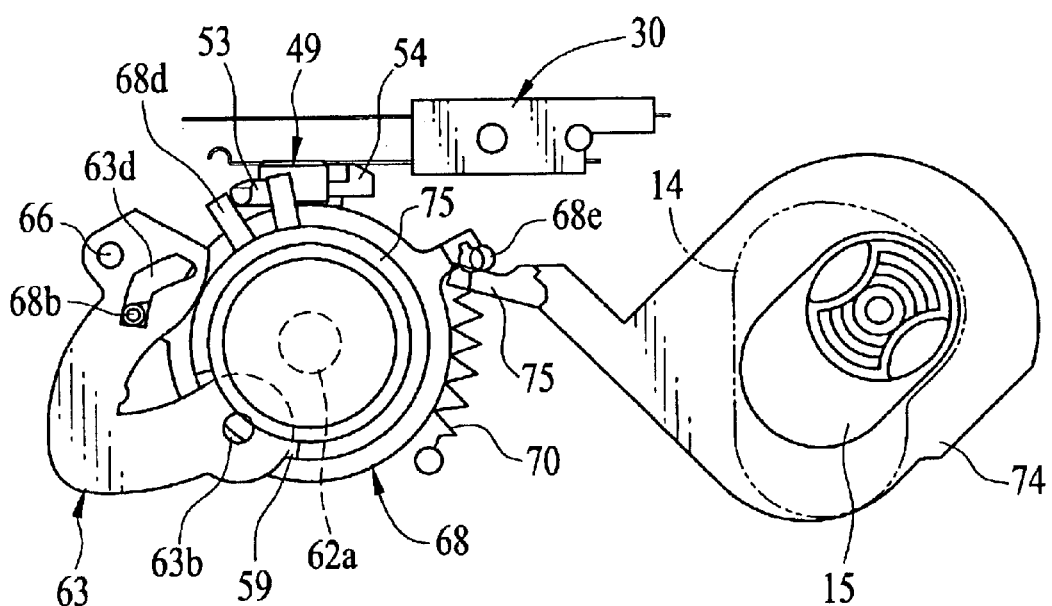

When the changeover ring 68 rotates counterclockwise from the initial position, the aperture changeover plate 63 is rotated clockwise due to the engagement with the changeover ring 68, as shown in FIG. 12. Then, the aperture portion 63a is out of the photographic optical axis L, so that photography is carried out through the large aperture 62a. When the changeover ring 68 rotates counterclockwise, the pair of the arm hold pins 68c, 68d rotate the stop lever 49 to the slow shutter speed position.

Figure 13:
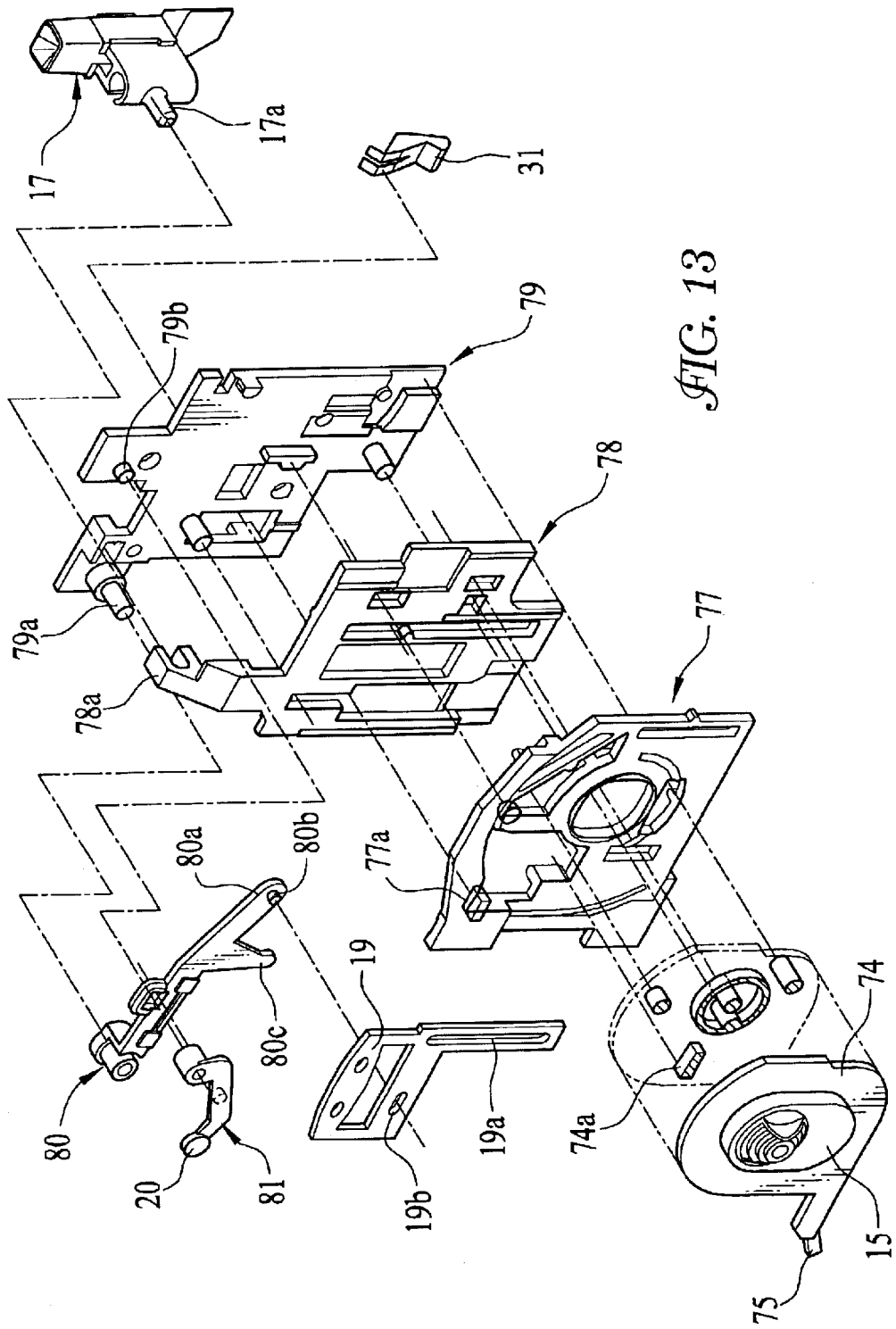
FIG. 13 is an exploded perspective view of a photography mode changeover mechanism.

In FIG. 13, the photography mode changeover mechanism 25 includes the operation member 15, a support plate 77, a slide plate 78, a base plate 79, the light amount reduction plate 19, a light amount reduction lever 80 and an indication lever 81.

Figure 14:
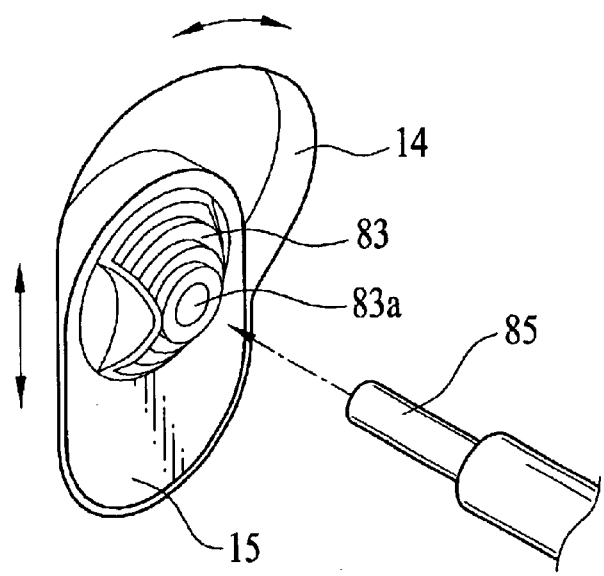
FIG. 14 is an explanatory view showing inspection of the photography mode changeover mechanism.

As shown in FIG. 14, the operation member 15 has a conical-shaped hook portion 83 in the front side. The hook portion 83 has plural steps arranged concentrically to ensure to catch a user's finger. After the lens-fitted photo film unit 2 is assembled, an inspection jig 85 is inserted into an inspection opening 83a formed in the center of the hook portion 83. Then, inspection of the photography mode changeover mechanism 25 is carried out by moving the inspection jig 85.

In FIG. 13, the base plate 79 is attached to the front side of the print circuit board 29. The slide plate 78 and the support plate 77, held by the base plate 79, are vertically slidable. The operation member 15 is rotatably held in the support plate 77. The support plate 77 and the slide plate 78 are slid upward when the operation member 15 moves to the second position from the first position. The rotation of the operation member 15 to the third position slides the slide plate 78 upward without moving the support plate 77.

The slide plate 78 has a projection 78a that is engaged with a pin 17a of the flash charge indicator 17. When the operation member 15 is at the first position, the whole flash charge indicator 17 is inside the unit body 3. At the second or third position, the top portion of the flash charge indicator 17 is appeared outside the unit body 3.

A flash charge projection 77a is formed in the rear side of the support plate 77. The flash charge projection 77a enters openings formed in the slide plate 78 and the base plate 79, and presses the flash charge switch 31 when the operation member 15 is at the second or third position.

One end of the light amount reduction lever 80 is rotatably supported by a pin 79a on the base plate 79. A boss 80b is formed in the other end 80a of the light amount reduction lever 80. The boss 80b is inserted in an ellipse opening 19b formed in the light amount reduction plate 19.

The light amount reduction plate 19 has an ellipse opening 19a in which plural bosses on the front cover 26 is inserted to support the light amount reduction plate 19. Since the ellipse opening 19a extends vertically, the light amount reduction plate 19 is vertically movable inside the front cover 26.

A projection 74a is formed on the changeover plate 74 opposite to the operation member 15. When the operation member 15 is rotated to the third position, the projection 74a presses a branch portion 80c to rotate the light amount reduction lever 80 counterclockwise. Due to the engagement with the boss 80b, the light amount reduction plate 19 is moved upward to cover a portion of the flash emitter 7.

The indication lever 81 is engaged with the light amount reduction lever 80. One end of the indication lever 81 is rotatably supported by a pin 79b on the base plate 79. The photographic mode indicator 20 is provided on the other end of the indication lever 81. When the light amount reduction lever 80 rotates counterclockwise in FIG. 13, the indication lever 81 rotates clockwise to insert the photographic mode indicator 20 in front of the viewfinder 6.

The operation of the lens-fitted photo film unit 2 is described below. When the operation member 15 is at the first position (see FIG. 1), the lens-fitted photo film unit 2 is in the daylight photography mode in which the changeover ring 68 is kept at the initial position, as shown in FIG. 10. The aperture portion 63a is inserted in the lens barrel 57 such that the small aperture 63b is set on the photographic optical axis L. As shown in FIG. 6, the stop lever 49 is located at the fast shutter speed position in the daylight photography mode.

The flash charge projection 77a is away from the flash charge switch 31, so the main capacitor 33 is not charged in the daylight photography mode. The flash charge indicator 17 is kept inside the unit body 3. The projection 74a does not push the light amount reduction lever 80, so the light amount reduction plate 19 and the photographic mode indicator 20 are not appeared.

Since the main capacitor 33 is not charged, no flash light is discharged in the daylight photography mode. Photography is carried out through the small aperture 63b, as shown in FIG. 8. Moreover, since the support pad 54 of the stop lever 49 limits the rotation of the shutter blade 38, the shutter speed becomes faster. Thus, it is possible to carry out photography under appropriate condition for daylight and outdoor photography.

When a user slides the operation member 15 to the second position (see FIG. 2), the lens-fitted photo film unit 2 is in the daylight synchronized flash photography mode in which the changeover ring 68 is kept at the initial position, as shown in FIG. 11. Photography is carried out at the fast shutter speed through the small aperture 63b.

The flash charge projection 77a presses the flash charge switch 31, so the flash circuit is operated to charge the main capacitor 33. The slide plate 78 pushes the flash charge indicator 17 upward, so that the upper part of the flash charge indicator 17 is exposed. When the main capacitor 33 is fully charged, indication light from a light emission element in the flash circuit is emitted outside the unit body 3 through the flash charge indicator 17. The projection 74a does not push the light amount reduction lever 80, so the light amount reduction plate 19 and the photographic mode indicator 20 are not appeared.

In the daylight synchronized flash photography mode, flash light is emitted upon photography, so it is possible to increase exposure amount of a main subject. Since the support pad 54 holds the lower metal plate 30b, it is possible to ensure flash light emission at the time when the shutter blade 38 is at the full-open position, regardless of the fast shutter speed.

When the operation member 15 is rotated to the third position from the second position (see FIG. 3), the lens-fitted photo film unit 2 is in the night photography mode. As shown in FIG. 12, the linkage projection 75 of the changeover plate 74 presses the linkage pin 68d to rotate the changeover ring 68 in the counterclockwise direction from the initial position against the bias of the extension spring 70. Interlocked with the changeover ring 68, the aperture plate 63 is rotated to retract the small aperture 63b out of the photographic optical axis L. The stop lever 49 is set at the slow shutter speed position, as shown in FIG. 7.

In the night photography mode, rotation of the operation member 15 causes the slide plate 78 to slide upward from a position in the daylight synchronized flash photography mode. Although the flash charge indicator 17 also moves upward, it is possible to guide indication light to the top side of the unit body 3. The support plate 77 is kept at the same position as the daylight synchronized flash photography mode, so the flash charge projection 77a keeps the flash charge switch 31 on.

The changeover plate 74 presses the branch portion 80c. The light amount reduction lever 80 rotates counterclockwise in the drawing to lift the light amount reduction plate 19, so the top portion of the light amount reduction plate 19 is inserted in front of the flash emitter 7. In addition, the indication plate 20 is in front of the viewfinder 6 to inform a user of the night photography mode.

The flash amount reduction plate 19 partially shields flash light from the flash emitter 7 to reduce the amount of flash light. In the night photography mode, photography at the slow shutter speed through the fixed aperture 62a makes it possible to increase exposure amount of background light without causing over exposure of the main subject. Such condition is appropriate for night photography in which the background is much darker than the main subject.

In the above embodiment, the stop lever is interlocked with the two arm hold pins. Due to unstable engagement between the stop lever and the arm hold pins, there is possibility that the stop lever is stopped at a position near the fast or slow shutter speed positions. In order to change the shutter speed properly, the stop lever must be stably engaged with the arm hold pins of the changeover ring.

Figure 15:
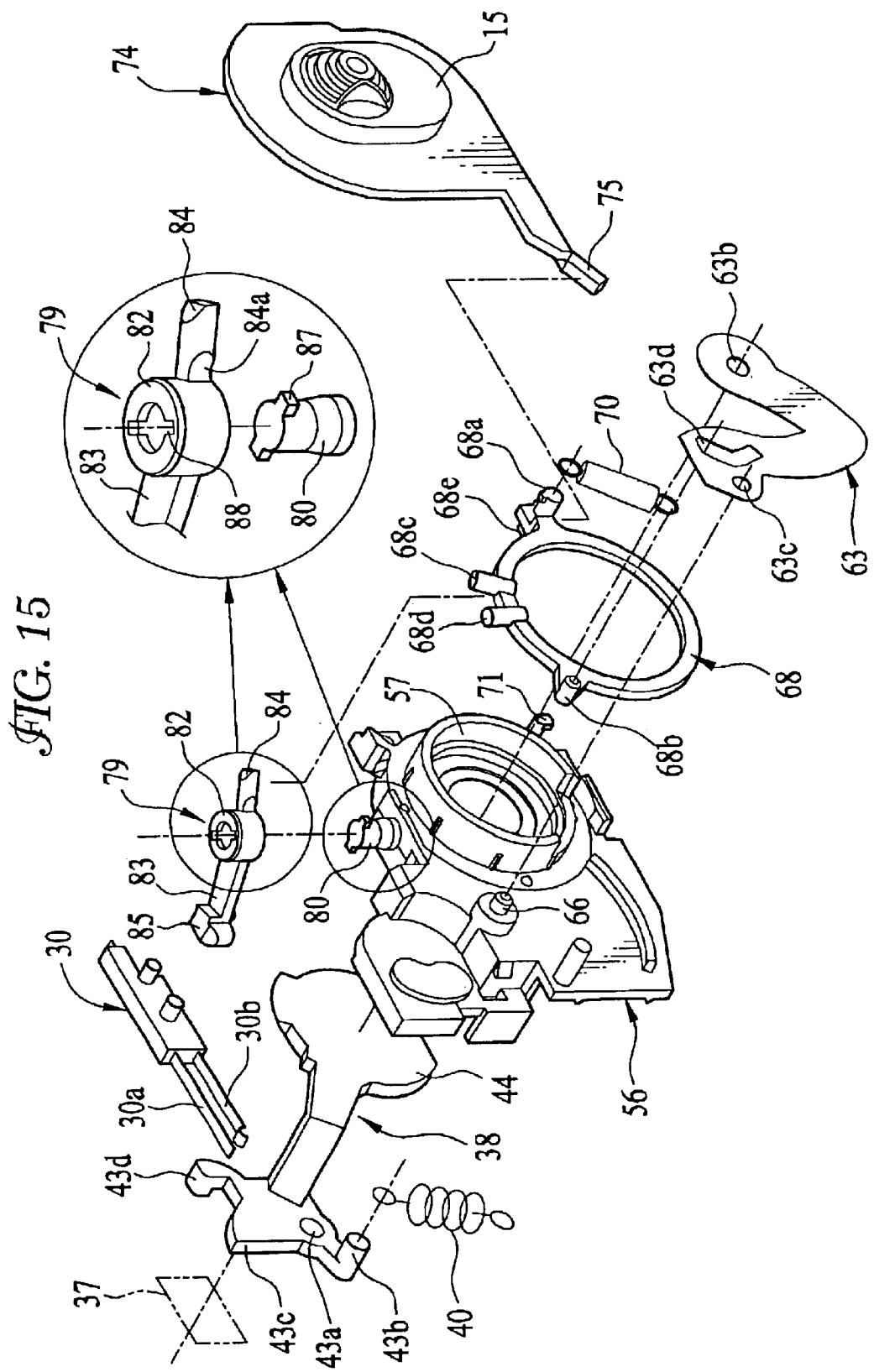
FIG. 15 is an exploded perspective view of the a shutter device and an exposure device according to another embodiment.
Figure 16:
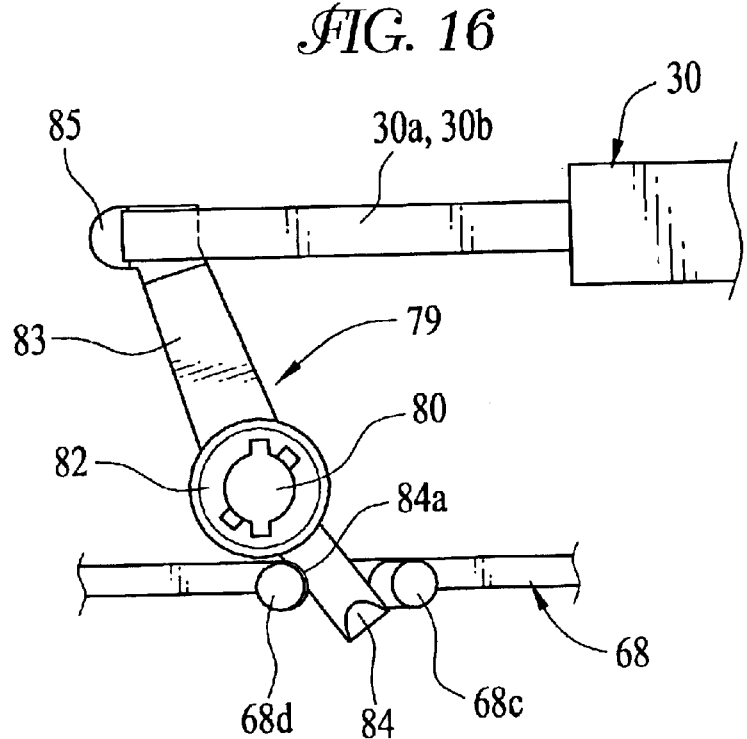
FIGS. 16 and 17 are top plan views of a stop lever at a fast shutter speed position and a slow shutter speed position, respectively.
Figure 17:
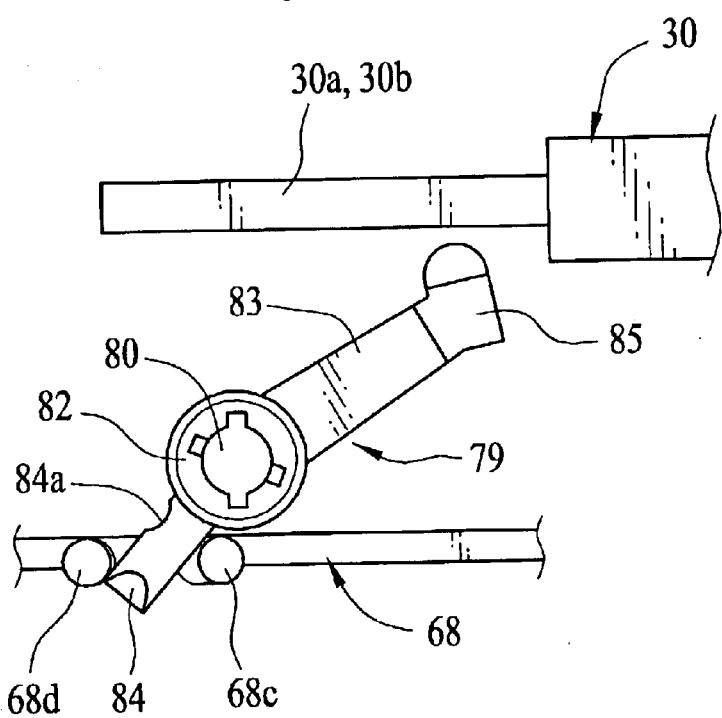

FIGS. 15, 16 and 17 show another embodiment to make stable engagement between the stop lever and the changeover ring. Same reference numerals are attached to the same components in the previous embodiment. In FIG. 15, a pin 80 is formed on the top side of the lens holder 56 to hold a boss 82 of a stop lever 79 in rotatable manner. The stop lever 79 has the boss 82, a pair of arms 83, 84 and a support pad 85. The support pad 54 is formed on an end portion of the arm 83. The arm 84 is held between the arm hold pins 68c, 68d.

A pair of key projections 87 is formed symmetrically on the top of the pin 80. The key projections 87 are engaged with a key groove 88 formed in the boss 82 of the stop lever 79. After the key projections 87 are stuck to the boss 82 through the key groove 88, the stop lever 79 is slightly rotated so that the key projections 87 catch the top surface of the boss 82. Thereby, it is possible to prevent the stop lever 79 from being disengaged from the lens holder 56.

The stop lever 79 is rotatable between a fast shutter speed position shown in FIG. 16, and a slow shutter speed position shown in FIG. 17. At the fast shutter speed position, the support pad 85 is in contact with the lower metal plate 30b of the synchronization switch 30. As described in the previous embodiment, the rotation of the shutter blade 38 is limited at the position where the metal plates 30a, 30b are put between the synchronization projection 43d and the support pad 84. Thus, it is possible to carry out photography at a fast shutter speed, 1/120 sec for instance.

At the slow shutter speed position, the support pad 85 is away from the free end of the lower metal plate 30b, as shown in FIG. 7. Since the support pad 85 does not limit the rotation of the shutter blade 38, photography is carried out at a slow shutter speed, 1/45 sec for instance.

The stop lever 79 is interlocked with the changeover ring 68, as described above. The stop lever 79 is at the fast shutter speed position when the operation member 15 is at the first and second positions. When the operation member 15 is rotated to the third position, the changeover ring 68 is rotated in the plane perpendicular to the drawing. Then, the arm hold pin 68c presses the arm 84 to rotate the stop lever 79 to the slow shutter speed position. When the operation member is rotated to the second position from the third position, the arm hold pin 68d presses the arm 84 to rotate the stop lever 79 to the fast shutter speed position.

Since the stop lever 79 rotates in the plane perpendicular to the rotational plane of the changeover ring 68, engagement between the stop lever 79 and the changeover ring 68 is gradually changed as the changeover ring 68 rotates. Especially, engagement between the stop lever 79 and the changeover ring 68 is not stable, when the operation member 15 is rotated to the second position from the third position.

In order to ensure stable engagement at the initial position, the arm hold pin 68d is fit into a notch 84c formed in the arm 84. Thus, the stop lever 79 is moved to the fast shutter speed position without being stopped at a position between the fast and slow shutter speed positions. Other mechanical parts than the stop lever 79 may have notches in order to make stable engagement.

It is possible to move the stop lever between the fast shutter speed position and the slow shutter speed position, without being interlocked with changeover ring. In that case, the stop lever is kept at one of these positions by the bias of a spring, and moved to the other position upon changing the photography mode of the lens-fitted photo film unit 2.

The stop lever may be slidable between the fast shutter speed position and the slow shutter speed position. It is also possible to obtain more than two shutter speeds by adjusting the movement of the stop lever.

In order to reduce the manufacture cost, it is effective to provide plural lens-fitted photo film units with fixed shutter speed. The shutter speed is decided by adjusting the position of a stopper underneath the synchronization switch of the flash circuit. It is also possible to obtain a slow shutter speed by removing the stopper below the synchronization switch. Next, the embodiment to provide lens-fitted photo film units with different shutter speeds is described.

Figure 18:
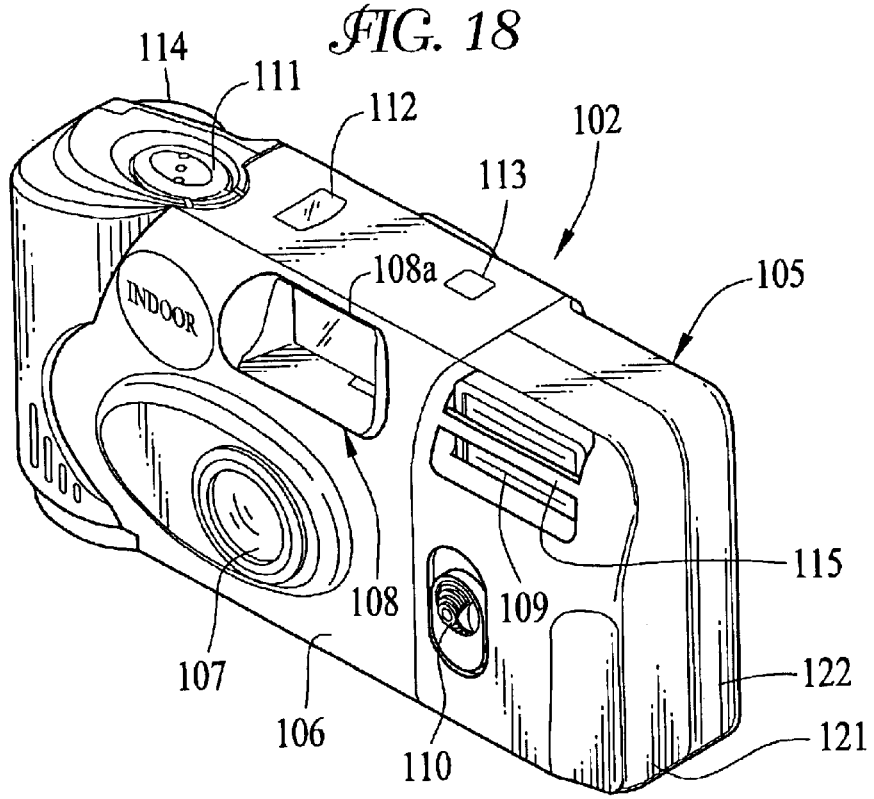
FIGS. 18 and 19 are perspective views of indoor-type and outdoor-type lens-fitted photo film units.

FIG. 18 shows an indoor-type lens-fitted photo film unit 102 in which the shutter speed and the aperture size are decided for indoor photography. An outdoor-type lens-fitted photo film unit 103, shown in FIG. 19, has a faster shutter speed and a smaller aperture size compared to the indoor-type lens-fitted photo film unit 102. These lens-fitted photo film units 102, 103 have common mechanical parts in order to reduce manufacture cost.

In FIG. 18, the indoor-type lens-fitted photo film unit 102 has a unit body 105 and a label 106. A taking lens 107, an objective-side window 108a of a viewfinder 108, a flash emitter 109 and a flash operation member 110 are provided in the front side of the unit body 105. A shutter button 111, a frame counter window 112 and a flash charge indication window 113 are provided in the top side of the unit body 105. A portion of a winding dial 114 is exposed in the rear side of the unit body 105. The label 106, glued to a portion of the unit body 105, has a mark "indoor" to indicate indoor use.

The flash operation member 110 is slidable between an off position, shown in FIG. 18, to prohibit flash light emission and an on position to carry out flash photography. A shielding plate 115 is located in front of the flash light emitter 109.

Figure 20:
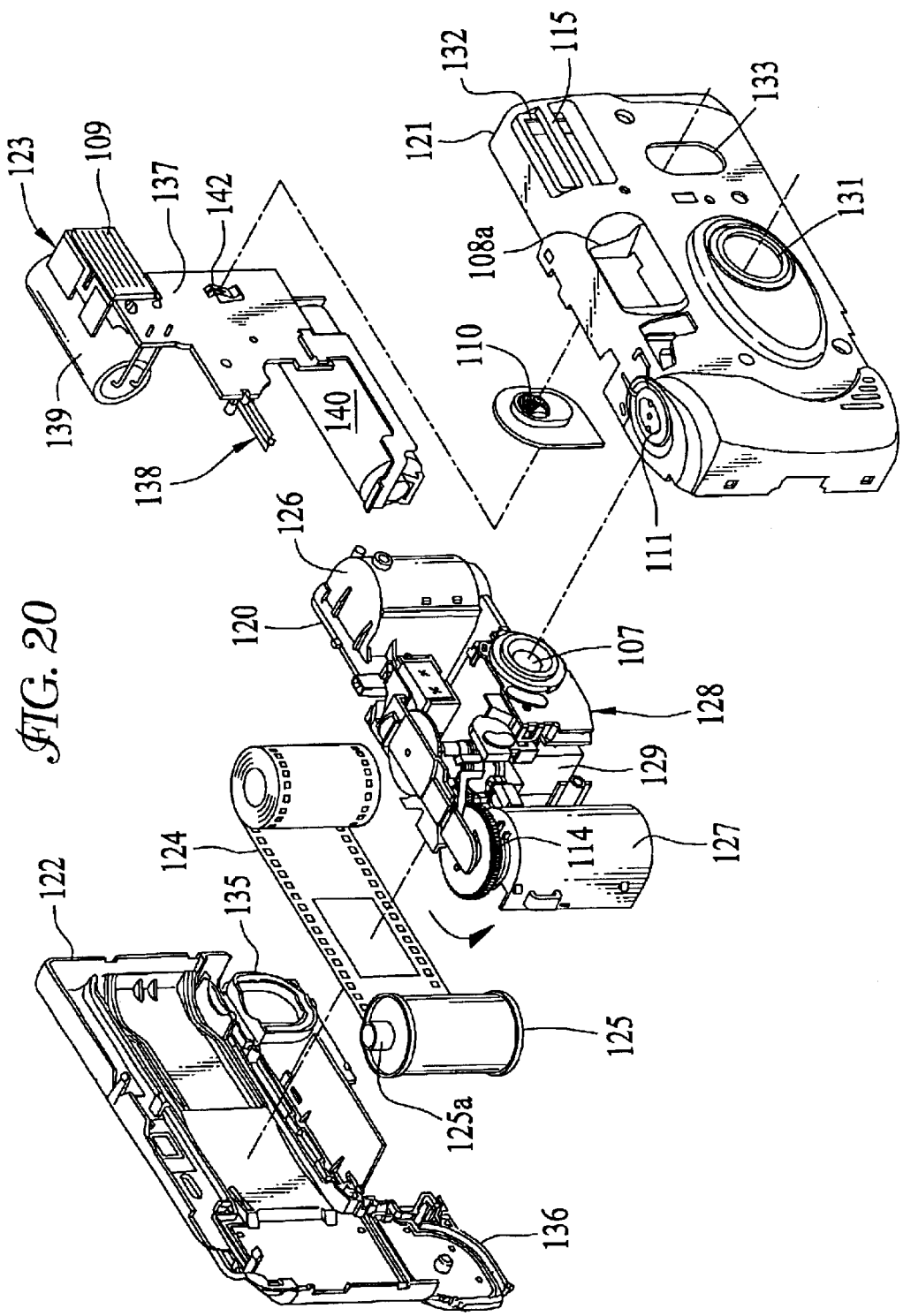
FIG. 20 is an exploded perspective view of the lens-fitted photo film unit of FIG. 18.
Figure 21:
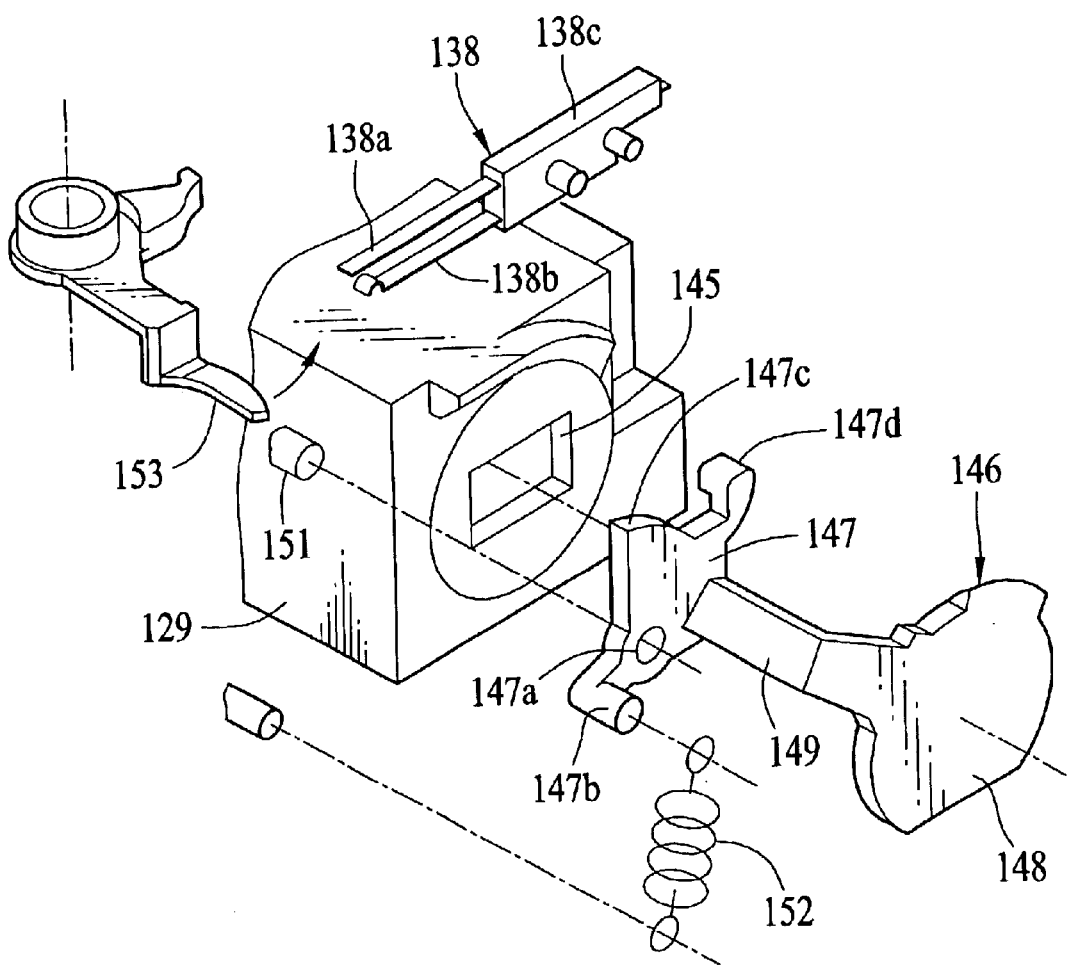
FIG. 21 is a perspective view of a shutter mechanism of the lens-fitted photo film unit of FIG. 18.

In FIG. 20, the unit body 5 comprises a main body 120, a front cover 121, a rear cover 122, a flash device 123, a film chamber 126 and a cartridge chamber 127. A film cartridge 125 is loaded in a cartridge chamber 127. An unexposed photo filmstrip 124, drawn out of the film cartridge 125, is contained in the film chamber 126. Any type of photo film, such as ISO 135 type and IX-240 type, is used as the photo filmstrip 124.

A light shielding tunnel 129 is assembled to the middle front side of the main body 120 to decide each exposure frame on the photo filmstrip 124. The light shielding tunnel 129 of the indoor-type lens-fitted photo film unit 102 does not have a stopper to make the shutter speed faster. The light shielding tunnel 129 may be integrated with the main body 120. An exposure device 128 including the taking lens 107 is attached to the front side of the light shielding tunnel 129. A shutter mechanism, a film winding mechanism and a frame counter mechanism are attached assembled to the main body 120.

The winding dial 114 is rotatably attached to the top side of the cartridge chamber 127. The winding dial 114 has a shaft on the bottom side that fits into a spool 125a of the film cartridge 125. When the winding dial 114 is rotated counterclockwise (shown by the arrow in the drawing), the film winding mechanism is actuated to draw an exposed frame of the photo filmstrip 124 into the film cartridge 125.

The front cover 121 to cover the front side of the main body 120 has a shutter button 111 and the objective-side window 108a of a viewfinder 108. The taking lens 107, the flash emitter 109 and the flash operation member 110 are exposed through openings 131, 132 and 133 formed in the front cover 121. The shielding plate 115 is integrated with the front cover 121 of the indoor-type lens-fitted photo film unit 102. The shielding plate 115 is disposed so as to cross the opening 132 to expose the flash light emitter 109.

The rear cover 122 with a pair of bottom lids 135, 136 covers the rear side of the main body 120. The bottom lids 135, 136 cover the bottom side of the film chamber 126 and the cartridge chamber 127 in light-tight manner. The bottom lid 136 is opened to take the film cartridge 125 with exposed photo filmstrip 124 inside.

The flash device 123 has a print circuit board 137 to which electrical parts for a flash circuit, such as a synchronization switch 138, a main capacitor 139 and a battery 140, are soldered. When the operation member 110 is moved to the on position, a metal plate 142 is pressed onto a metal contact on the print circuit board 137. Then, the flash circuit is driven to charge the main capacitor 139. After the main capacitor 139 is fully charged, indication light is emitted through the flash indicator 113. When the synchronization switch 138 is turned on, flash light is emitted through the flash light emitter 109.

The outdoor-type lens-fitted photo film unit 103 has the same flash device 123 as the indoor-type lens-fitted photo film unit 102. In order to carry out synchronized flash photography, light amount of the flash device 123 is adjusted to make proper exposure of a main subject under the condition of a fast shutter speed and a small aperture.

On the other hand, the indoor-type lens-fitted photo film unit 102 has a slow shutter speed and a large aperture, so as to increase exposure amount of a background behind the main subject. Since the shielding plate 115 decreases flash light applied to the main subject, it is possible to prevent over-exposure of the main subject.

A rectangular-shaped exposure aperture 145 is formed in the front side of the light shielding tunnel 129. A shutter blade 146 is rotatably attached to a pin 151 that is provided on the main body 120. The shutter blade 146 has a base portion 147, a blade portion 148 and a connection portion 149. The pin 151 is inserted into an opening 147a formed in the base portion 147 to hold the shutter blade 146. One end of a coil spring 152 is hooked on a pin formed in the main body 120. The other end of the coil spring 152 is hooked on a pin 147b of the shutter blade 147. The coil spring 152 biases the shutter blade 146 counterclockwise, so that the shutter blade 146 is held at a close position in which the blade portion 148 covers the exposure aperture 145.

The shutter release mechanism has a shutter drive lever 153 that is rotatably supported on the base body 120. The shutter charge mechanism rotates the shutter drive lever 153 clockwise to a charge position from a release position. When the shutter button 110 is pressed down, the shutter release mechanism is actuated to rotate the shutter drive lever 153 counterclockwise toward the release position. In the rotation, the shutter drive lever 153 strikes a struck portion 147c of the shutter blade 146 to rotate the shutter blade 146 against the bias of the coil spring 152 to an end portion (see FIG. 23) where the shutter blade 146 contacts the stopper pin 155. Thereafter, the shutter blade 146 is rotated to the close position by the bias of the coil spring 152.

The synchronization switch 138 has upper and lower metal plates 138a, 138b and a holder 138c. The holder 138c holds fixed ends of the metal plates 138a, 138b at a certain distance. The free ends of the metal plates 138a, 138b are in the rotational orbit of a synchronization projection 147d provided in the base portion 147. When the shutter blade 146 rotates toward the end position, the synchronization projection 147d presses the upper metal plate 138a. The upper metal plate 138a is resiliently bent to contact the lower metal plate 138b, so that the synchronization switch 138 is turned on to emit flash light toward the main subject.

In front of the shutter blade 146, an aperture plate 156 (see FIG. 23) and the taking lens 107 are disposed. The aperture size of an aperture 156a is large enough for indoor photography. The f-number of the indoor-type lens-fitted photo film unit 102 is 5.6.

Figure 19:
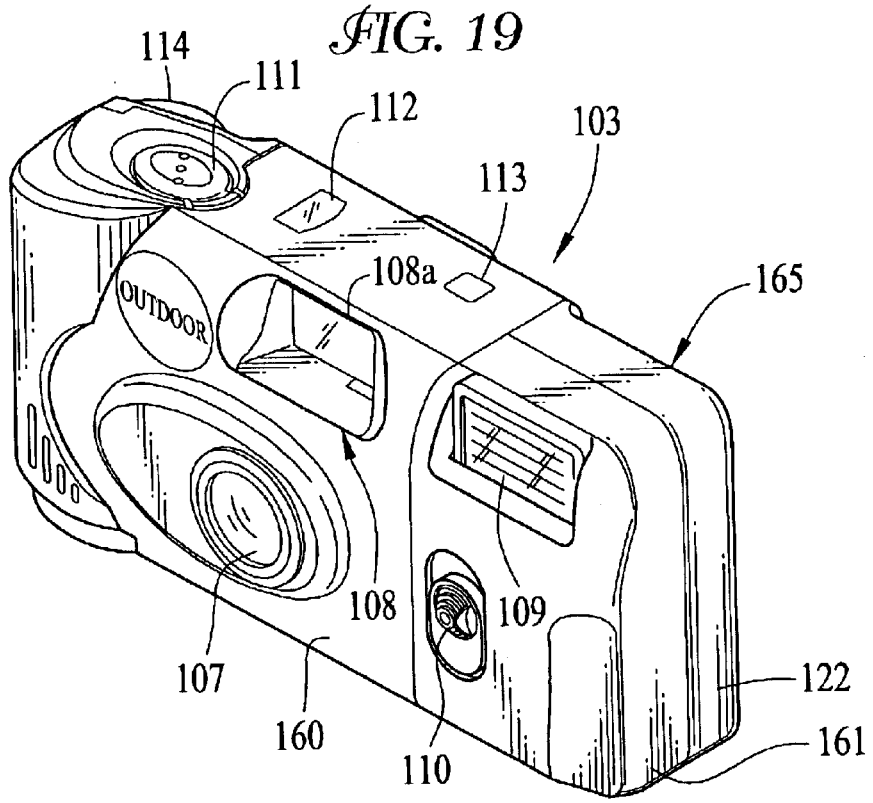
Figure 22:
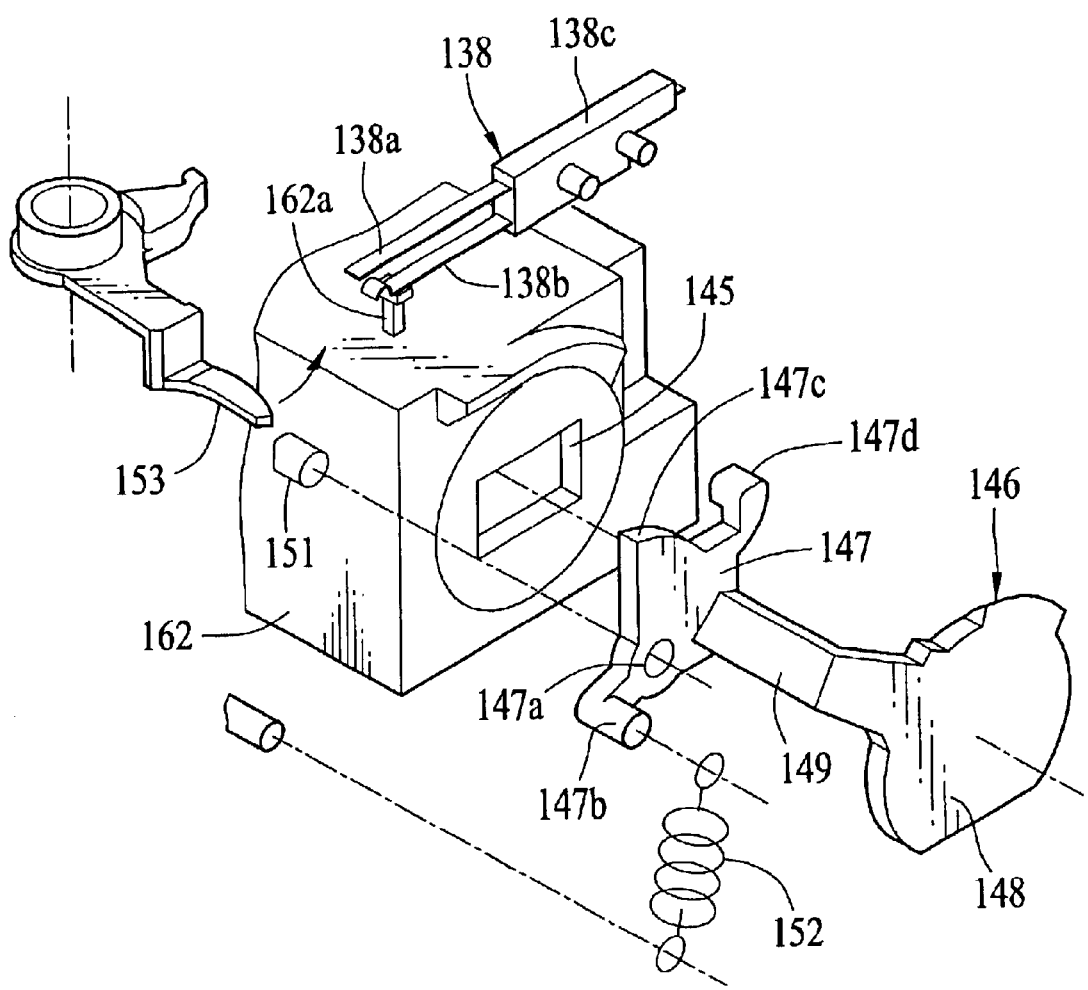
FIG. 22 is a perspective view of a shutter mechanism of the lens-fitted photo film unit of FIG. 19.
Figure 24:
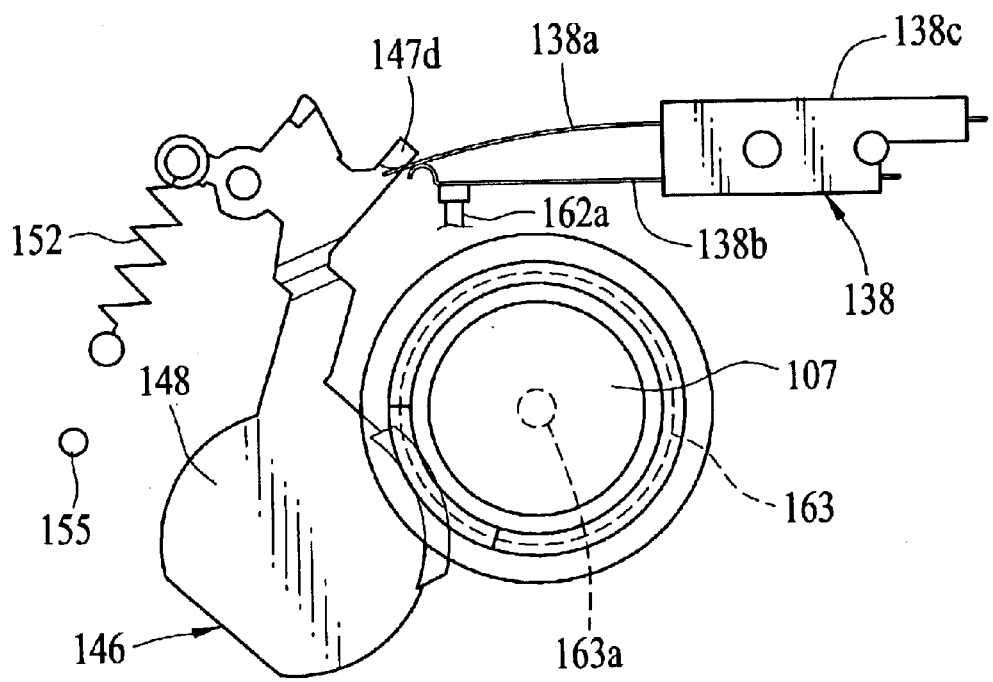
FIG. 24 is a front plan view of the shutter mechanism of the lens-fitted photo film unit of FIG. 19.

As shown in FIGS. 19, 22 and 24, the outdoor-type lens-fitted photo film unit 103 has the same components as the indoor-type lens-fitted photo film unit 102 other than a label 160, a front cover 161, a light shielding tunnel 162 and an aperture plate 163. In FIGS. 19, 22 and 24, same reference numerals are attached to the same components as the indoor-type lens-fitted photo film unit 102.

In FIG. 19, the label 160 has a mark "outdoor" to inform a user of outdoor use. The front cover 161 does not have a shielding plate in front of the flash emitter 109. In FIG. 22, a stopper 162a is integrally formed on the top side of the light shielding tunnel 162. The stopper 62a is in contact with the free end of the lower metal plate 138b of the synchronization switch 130. The stopper 162a may be separated from the lower metal plate 138b so long as the stopper 162a is located below the lower metal plate 138b. The aperture size of a small aperture 163a formed in the aperture plate 163 is smaller than that of the aperture 156a, as shown in FIG. 24.

Figure 23:
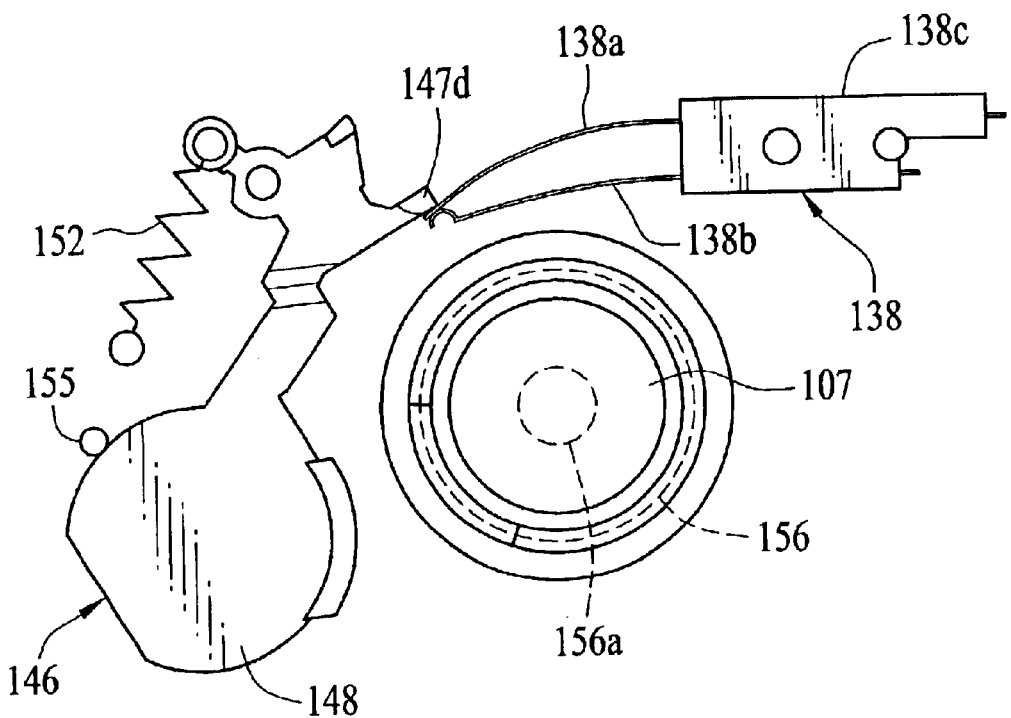
FIG. 23 is a front plan view of the shutter mechanism of the lens-fitted photo film unit of FIG. 18.

As shown in FIG. 23, the indoor-type lens-fitted photo film unit 102 does not have a stopper. In photography, the lower metal plate 138b is bent downward by the synchronization projection 147d, so the shutter blade 146 is rotated to the end position. The shutter speed of the indoor-type lens-fitted photo film unit 102 is 1/45 sec, for instance.

As shown in FIG. 24, the stopper 162a of the outdoor-type lens-fitted photo film unit 103 prevents the lower metal plate 138b from being bent downward. Thus, rotation of the shutter blade 146 is limited at a full-open position where the upper and lower metal plates 138a, 138b are contacted to each other. Since the rotation of the shutter blade 146 becomes smaller, compared to the indoor-type lens-fitted photo film unit 102, it is possible to obtain a faster shutter speed, 1/110 sec for instance.

At the full-open position, the shutter blade 146 is completely retracted from the photographic light path when the synchronization switch 138 is turned on. Thus, it is possible to ensure flash light emission when the exposure aperture 145 is fully open.

Figure 25:
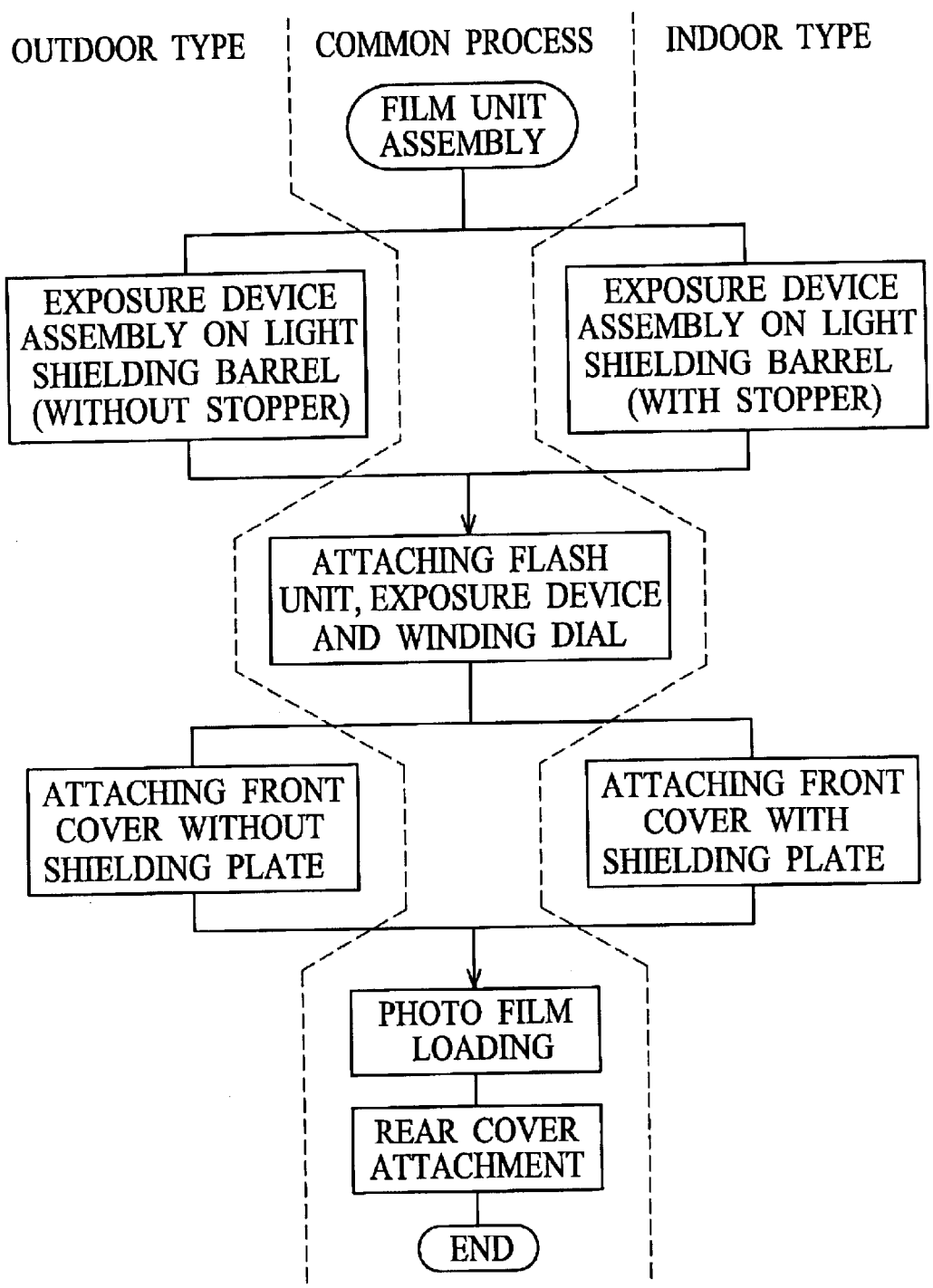
FIG. 25 is a flow chart of assembly process of the indoor-type and outdoor-type lens-fitted photo film units.

The lens-fitted photo film units 102, 103 are manufactured in the process shown in FIG. 25. At first, the exposure device 128 is attached to the light shielding tunnel 129, 163. The light shielding tunnel 129 without a stopper is chosen in manufacturing the indoor-type lens-fitted photo film unit 102. The film counter mechanism, the shutter mechanism, the aperture plate 156 with the large aperture 156a and the taking lens 107 are attached to the light shielding tunnel 129. On the other hand, the light shielding tunnel 162 with the stopper 162a is chosen to manufacture the outdoor-type lens-fitted photo film unit 103. The film counter mechanism, the shutter mechanism, the aperture plate 163 with the small aperture 163a and the taking lens 107 are attached to the light shielding tunnel 162.

After attaching the light shielding tunnel 129, 162 to the main body 120, the flash device 123 and the winding dial 114 are attached to the main body 120. Then, the front cover 121 with the shielding plate 115 is fixed to the main body 120 in manufacturing the indoor-type lens-fitted photo film unit 102. In manufacturing the outdoor-type lens-fitted photo film unit 103, the front cover 161 without a shielding plate is fixed to the main body 120.

The film cartridge 125 with the photo filmstrip 124 is loaded in the main body 120 with the front cover 121, 161. The film cartridge 125 is contained in the cartridge chamber 127, and the rolled photo filmstrip 124 is put in the film chamber 126. After cartridge loading, the rear cover 122 is attached to the rear side of the main body 120. Then, the film chamber 126 and the cartridge chamber 127 are covered by the bottom lids 135 and 136, so that the unit body 105, 165 is manufactured. The label 106, 160 is glued to the unit body 105, 165 to finish manufacturing the lens-fitted photo film unit 102, 103.

The unit body 105, 165 of the indoor-type and outdoor-type lens-fitted photo film units 102, 103 shares mechanical and electrical parts other than the front cover, light-shielding tunnel and the aperture plate. Thus, it is possible to reduce the manufacture cost of the lens-fitted photo film units 102, 103. Moreover, it is possible to increase productivity of the lens-fitted photo film units 102, 103 by sharing the same manufacture line.

The indoor-type and outdoor-type lens-fitted photo film units 102, 103 may share the same aperture plate and front cover in order to reduce the manufacture cost. The indoor-type lens-fitted photo film unit 102 may be different from the outdoor-type lens-fitted photo film unit 103 in terms of film speed, focal length of the taking lens and the appearance.

The stopper to limit the rotation of the shutter blade may be attachable to the light shielding tunnel. In that case, the stopper is attached to the light shielding tunnel to manufacture the lens-fitted photo film unit with the fast shutter speed. The stopper may be attached to the other parts, such as the main body and the front cover.

Figure 26:
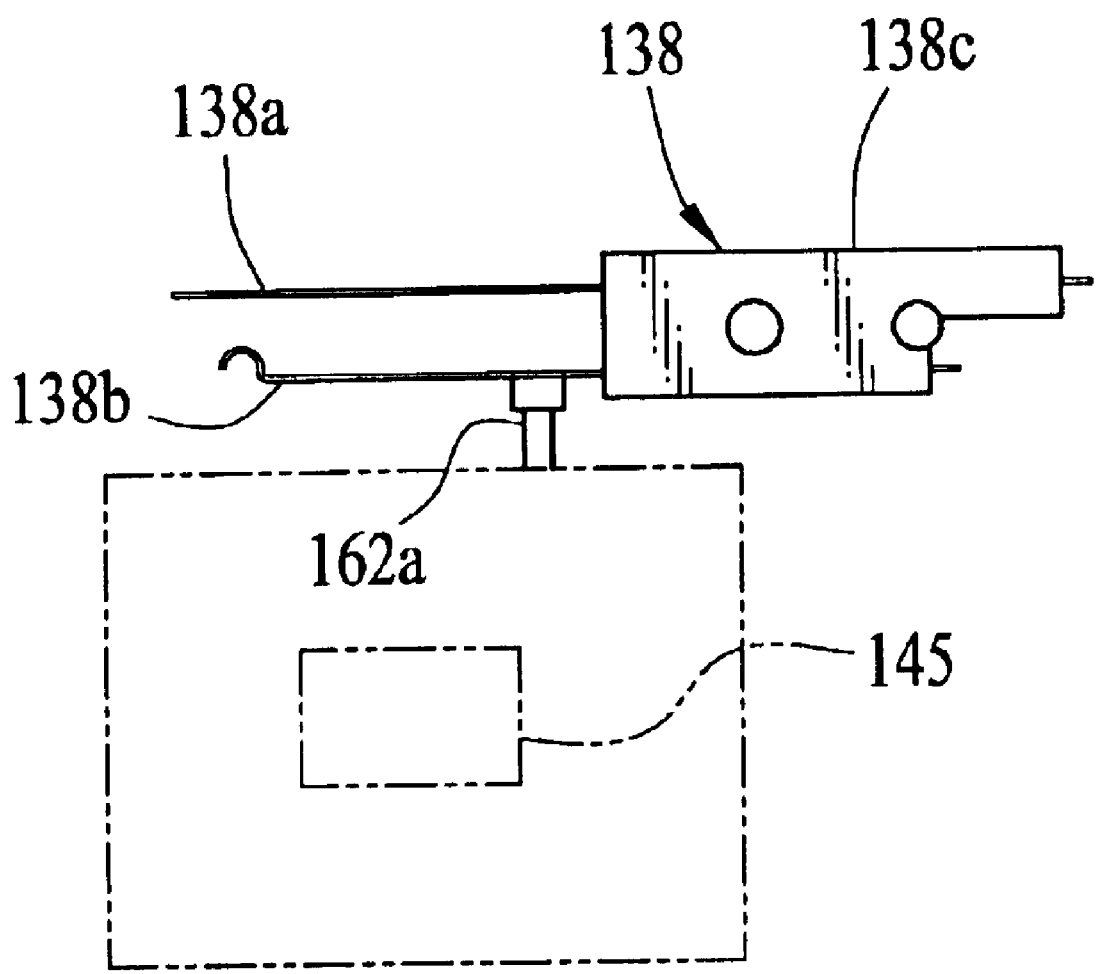
FIG. 26 is an explanatory view of the stopper of a lens-fitted photo film unit of middle shutter speed.

In the above embodiment, the indoor-type and outdoor-type lens-fitted photo film units 102, 103 have the slow and fast shutter speeds, respectively. A middle shutter speed between the fast and slow shutter speeds is obtained by disposing the stopper 162a near the fixed end of the lower metal plate 138b, as shown in FIG. 26. It is possible to adjust the shutter speed by changing the position of the stopper 162a below the lower metal plate 138b.

The stopper to limit the rotation of the shutter blade may be movable between a fast shutter speed position to hold the synchronization switch, and a slow shutter speed position not to hold the synchronization switch. The movable stopper is preferably linked to an operation member to change the photography mode. It is possible to manufacture the lens-fitted photo film unit with changeable shutter speeds, by attaching such movable stopper to the main body. It is also possible to manufacture the lens-fitted photo film units with fast, slow and changeable shutter speeds by choosing the stopper type.

Instead of integrating the shielding plate 115 with the front cover 121, it is possible to provide the shielding plate separately from the front cover. In that case, it is possible to use same front cover to manufacture the indoor-type and outdoor-type lens-fitted photo film units 102, 103. Then, the shielding plate is attached to the front cover of the indoor-type lens-fitted photo film unit 102.

It is possible to apply the present invention to a low-price camera, such as a compact camera. The present invention is not to be limited to the above embodiment but, on the contrary, various modifications will be possible to those skilled in the art without departing from the scope of claims appended hereto.

What is claimed is:

1. A lens-fitted photo film unit that has a shutter blade and a flash device with a synchronization switch, said shutter blade being held at a closed position to close an exposure aperture, said flash device emitting flash light when first and second contact plates of said synchronization switch are in contact with each other, said shutter blade being arranged so that the shutter blade presses said first contact plate onto said second contact plate during movement from said closed position to an end position via an open position to open said exposure aperture, said lens-fitted photo film unit comprising:

a stopper disposed so that when the shutter blade presses the first contact plate onto the second contact plate, the shutter blade strikes the stopper through said first and second contact plates to limit the movement of said shutter blade at said open position.

2. A lens-fitted photo film unit according to claim 1, further comprising a light shielding tunnel in which said exposure aperture is formed, said stopper being provided on said light shielding tunnel.

3. A lens-fitted photo film unit according to claim 1, wherein said second contact plate has a fixed end and a free end, and said stopper is located in the free end side of said second contact plate.

4. A lens-fitted photo film unit according to claim 2, wherein said stopper prevents said second contact plate from being deformed when said first contact plate presses said second contact plate.

5. The lens-fitted photo film unit of claim 1, wherein the stopper is disposed to that when the shutter blade presses the first contact plate onto the second contact plate, the stopper makes direct contact with the second contact plate.

6. A lens-fitted photo film unit that has a shutter blade and a flash device with a synchronization switch, said shutter blade being held at a closed position to close an exposure aperture, said flash device emitting flash light when first and second contact plates of said synchronization switch are in contact with each other, said shutter blade being arranged so that the shutter blade presses said first contact plate onto said second contact plate during movement from said closed position to an end position via an open position to open said exposure aperture, said lens-fitted photo film unit comprising:

a stop lever movable between a fast shutter speed position and a slow shutter speed position such that when the shutter blade is in the closed position, the stop lever is farther away from said second contact plate while in the slow shutter speed position than while in the fast shutter speed position, said stop lever being disposed so that while at said fast shutter speed position, when said shutter blade presses said first contact plate onto the second contact plate, the shutter blade strikes the stopper through the first and second contact plates to limit the movement of said shutter blade at said open position.

7. A lens-fitted photo film unit according to claim 6, wherein said second contact plate has a fixed end and a free end, and one end portion of said stop lever at said fast shutter speed is located in the free end side of said second contact plate.

8. A lens-fitted photo film unit according to claim 7, wherein said one end portion of said stop lever prevents said second contact plate from being deformed when said first contact plate presses said second contact plate.

9. A lens-fitted photo film unit according to claim 6, further comprising a lens holder to hold a taking lens;

wherein said stop lever is attached to said lens holder in rotatable manner.

10. A lens-fitted photo film unit according to claim 6, further comprising:

an operation member that is operated externally; and changeover means to move said stop lever according to the operation of said operation member.

11. A lens-fitted photo film unit according to claim 10, wherein said operation member turns on said flash device when said stop lever is at said slow shutter speed position.

12. A lens-fitted photo film unit according to claim 11, wherein said operation member is movable between a first position to turn off said flash device, a second position to turn on said flash device and hold said stop lever at said fast shutter speed position, and a third position to turn on said flash device and hold said stop lever at said slow shutter speed position.

13. A lens-fitted photo film unit according to claim 12, further comprising:

a fixed aperture fixed on a photographic optical axis; and an aperture plate with a small aperture that is smaller than said fixed aperture, said aperture plate being movable between a small aperture position to set said small aperture on said photographic light axis and a large aperture position in which said small aperture out of said photographic optical axis;

wherein said changeover means holds said aperture plate at said small aperture position when said stop lever is at said fast shutter speed position, and said changeover means holds said aperture plate at said large aperture position when said stop lever is at said slow shutter speed position.

14. The lens-fitted photo film unit of claim 6, further comprising a stopper pin disposed in a path of the shutter blade during exposure;

wherein the stopper pin is arranged so that when the stop lever is in the slow shutter speed position, the movement of the shutter blade during exposure is limited by the stopper pin as the shutter blade makes contact with the stopper pin; and wherein when the stop lever is in the fast shutter speed position, the stop lever limits deflection of the second contact plate so that, during exposure, the shutter blade does not make contact with the stopper pin.

15. The lens-fitted photo film unit of claim 6, wherein the stop lever is disposed to that when the shutter blade presses the first contact plate onto the second contact plate, the stop lever makes direct contact with the second contact plate.

16. A method for manufacturing a lens-fitted photo film unit that has a shutter blade and a flash device with a synchronization switch, said shutter blade being held at a closed position to close an exposure aperture, said flash device emitting flash light when first and second contact plates of said synchronization switch are in contact with each other, said shutter blade being arranged so that the shutter blade presses said first contact plate onto said second contact plate during movement from said closed position to an end position via an open position to open said exposure aperture, said method comprising the steps of:

deciding whether a fast shutter version or a slow shutter version of the lens-fitted photo film unit is to be manufactured; and if the fast shutter version is to be manufactured, attaching a stopper at a position so that when the shutter blade presses the first contact plate onto the second contact plate, the shutter blade strikes the stopper through said first and second contact plates to limit the movement of said shutter blade at said open position; and if the slow shutter version is to be manufactured, assembling the lens-fitted photo film unit without said stopper.

17. A method according to claim 16, wherein said stopper is provided on a light shielding tunnel in which said exposure aperture is formed.

18. A method according to claim 16, wherein said stopper is located in the free end side of said second contact plate.

19. A method according to claim 18, wherein said stopper prevents said second contact plate from being deformed when said first contact plate presses said second contact plate.

20. The lens-fitted photo film unit of claim 16, wherein if the fast shutter version is to be manufactured, the stopper is disposed to that when the shutter blade presses the first contact plate onto the second contact plate, the stopper makes direct contact with the second contact plate.

\* \* \* \* \*